US006943368B2

US 6,943,368 B2

(12) United States Patent
Amin et al.

(10) Patent No.: US 6,943,368 B2
(45) Date of Patent: Sep. 13, 2005

(54) QUANTUM LOGIC USING THREE ENERGY LEVELS

(75) Inventors: Mohammad H. S. Amin, Vancouver (CA); Anatoly Yu. Smirnov, Vancouver (CA); Alexander Maassen van den Brink, Vancouver (CA); Jeremy P. Hilton, Vancouver (CA); Miles F. H. Steininger, Vancouver (CA)

(73) Assignee: D-Wave Systems, Inc., Vancouver (CA)

( * ) Notice: Subject to any disclaimer, the term of this patent is extended or adjusted under 35 U.S.C. 154(b) by 64 days.

(21) Appl. No.: 10/719,925

(22) Filed: Nov. 20, 2003

(65) Prior Publication Data

US 2004/0165454 A1 Aug. 26, 2004

Related U.S. Application Data

(60) Provisional application No. 60/443,764, filed on Jan. 29, 2003, and provisional application No. 60/429,170, filed on Nov. 25, 2002.

(51) Int. Cl.$^7$ .............................................. H01L 29/06
(52) U.S. Cl. .......................... 257/31; 257/39; 365/162; 365/215
(58) Field of Search ...................... 257/31, 39; 365/162, 365/215

(56) References Cited

U.S. PATENT DOCUMENTS

| | | | |
|---|---|---|---|
| 5,323,344 | A | 6/1994 | Katayama et al. |
| 5,768,297 | A | 6/1998 | Shor |
| 6,459,097 | B1 | 10/2002 | Zagoskin |
| 6,495,854 | B1 | 12/2002 | Newns et al. |
| 6,563,311 | B2 | 5/2003 | Zagoskin |
| 6,627,915 | B1 | 9/2003 | Ustinov et al. |
| 6,803,599 | B2 | 10/2004 | Amin et al. |

2004/0077503 A1 4/2004 Blais et al.

OTHER PUBLICATIONS

U.S. Appl. No. 60/341,974, Il'ichev et al.
U.S. Appl. No. 60/370,087, Lidar et al.
U.S. Appl. No. 60/429,170, Amin et al.
Amin, M.H.S., A.N. Omelyanchouk, A.M. Zagoskin, 2001, "Mechanisms of spontaneous current generation in an inhomogeneous d–wave superconductor," Phys. Rev. B 63, 212502.
Amin, M.H.S., A.N. Omelyanchouk, S.N. Rashkeev, M. Coury, A.M. Zagoskin, 2002, "Quasiclassical Theory of Spontaneous Currents at Surfaces and Interfaces of d–wave Superconductors," Physica B 318, 162.
Averin, D.V., J.R. Friedman, J.E. Lukens, 2000, "Macroscopic resonant tunneling of magnetic flux," Phys. Rev. B 62, 11802.
Blais, A., A. Maassen van den Brink, A.M. Zagoskin, 2003, "Tunable Coupling of Superconducting Qubits," Phys. Rev. Lett. 90, 127901.

(Continued)

*Primary Examiner*—Sara Crane
(74) *Attorney, Agent, or Firm*—Jones Day; Brett Lovejoy

(57) ABSTRACT

A method for quantum computing with a quantum system comprising a first energy level, a second energy level, and a third energy level. The first energy level and said second energy level are capable of being degenerate with respect to each other. In the method a signal is applied to the quantum system. The signal has an alternating amplitude at an associated frequency such that (i) the frequency of the signal correlates with an energy level separation between the first energy level and the third energy level or (ii) the frequency of the signal correlates with an energy level separation between the second energy level and the third energy level. The signal induces an oscillation in the state of the quantum system between the first energy level and the second energy level.

26 Claims, 13 Drawing Sheets

OTHER PUBLICATIONS

Blais, A., A.M. Zagoskin, 2000, "Operation of universal gates in a solid–state quantum computer based on clean Josephson junctions between d–wave superconductors," Phys. Rev. A 61, 042308.

Bruder, C., A. van Otterlo, G.T. Zimanyi, 1995, "Tunnel junctions of unconventional superconductors," Phys. Rev. B 51, 12904.

Cohen–Tannoudji, C.N., 1998, "Manipulating atoms with photons," Rev. Mod. Phys. 70, p. 707–719.

DiVincenzo, D.P., 2000, "The Physical Implementation of Quantum Computation", published on ArXiv. org preprint server: quant–ph/0002077.

Dodd, J.L., M. A. Nielsen, M.J. Bremner, and R.T. Thew, 2002, "Universal quantum computation and simulation using any entangling Hamiltonian and local unitaries," Phys. Rev. A 65, 040301.

Došlić, N., O. Kühn, J. Manz, K. Sundermann, 1998, "The 'Hydrogen Subway'—A Tunneling Approach to Intramolecular Hydrogen Transfer Reactions Controlled by Ultrashort Laser Pulses," Jour. Phys. Chem. A 102, 9645–9650.

Ferguson, A.J., P.A. Cain, D.A. Williams, G.A.D. Briggs, 2002, "Ammonia–based quantum computer," Phys. Rev. A 65, 034303.

Feynman, R., 1965, *The Feynman Lectures on Physics vol. 3*, Addison–Wesley, Reading, Mass., pp. 8.11–8.14.

Friedman, J.R., D.V. Averin, 2002, "Aharonov–Casher–Effect Suppression of Macroscopic Tunneling of Magnetic Flux," Phys. Rev. Lett. 88, 050403.

Il'ichev, E., M. Grajcar, R. Hlubina, R. P. J. IJsselsteijn, H. E. Hoenig, H.–G. Meyer, A. Golubov, M. H. S. Amin, A. M. Zagoskin, A. N. Omelyanchouk, M. Yu. Kupriyanov, 2001, "Degenerate Ground State in a Mesoscopic $YBa_2Cu_3O_{7-x}$ Grain Boundary Josephson Junction," Phys. Rev. Lett. 86, 5369.

Il'ichev, E., V. Zakosarenko, L. Fritzsch, R. Stolz, H.E. Hoenig, H.–G. Meyer, M. Götz, A.B. Zorin, V.V. Khanin, A.B. Pavolotsky, J. Niemeyer, 2001, "Radio–frequency based monitoring of small supercurrents," Rev. Sci. Instru. 72, 1882–1887.

Kulik, I.O., T. Hakioglu, A. Barone, 2002, "Quantum Computational Gates with Radiation Free Couplings," arXiv.org:cond–mat/0203313.

Lu, N., E.J. Robinson, P.R. Berman, 1987, "Coherent dynamics and complete population depletion of a special three–level quantum system," Phys. Rev. A 35, 5088–5098.

Maassen van den Brink, A., 2003, "Comment on 'Aharonov– Casher–Effect Suppression of Macroscopic Tunneling of Magnetic Flux'," arXiv.org:cond/mat/0206218.

Makhlin Y., G. Schön, and A. Shnirman, 2001, "Quantum–State Engineering with Josephson–Junction Devices," Rev. of Mod. Phys. 73, pp. 357–400.

Martinis, J.M., S. Nam, J. Aumentado, C. Urbina, 2002, "Rabi Oscillations in a Large Josephson–Junction Qubit," Phys. Rev. Lett. 89, 117901.

Metcalf, J., P. van der Straten, 1999, *Laser Cooling and Trapping*, Springer–Verlag, New York, pp. 259–261.

Mooji, J.E., T.P. Orlando, L. Levitov, L. Tian, C.H. van de Wal, S. Lloyd, 1999, "Josephson Persistent–Current Qubit," Science 285, 1036.

Murali, K.V.R.M., D.S. Crankshaw, T.P. Orlando. Z. Dutton, W.D. Oliver, 2003, "Probing Decoherence with Electromagnetically Induced Transparency in Superconductive Quantum Circuits," arXiv.org:cond–mat/0311471.

Nicoletti, S., H. Moriceau, J.C. Villegier, D. Chateigner, B. Bourgeaux, C. Cabanel, J.Y. Laval, 1996, "Bi–epitaxial YBCO grain boundary Josephson junctions on $SrTiO_3$ and sapphire substrates," Physica C 269, 255–267.

Nielsen, M.A., and I.L. Chuang, 2000, *Quantum Computation and Quantum Information*, Cambridge University Press, Cambridge, UK, p. 174.

Orlando, T.P., J.E. Mooij, L. Tian, C.H. van der Wal, L.S. Levitov, S. Lloyd, J.J. Mazo, 1999, "Superconducting persistent–current qubit," Phys. Rev. B 60, 15398.

Palao, J.P., R. Kosloff, 2002, "Quantum Computing by an Optimal Control Algorithm for Unitary Transformations," Phys. Rev. Lett. 89, 188301.

Plastina, F., G. Falci, 2002, "Communicating Josephson Qubits," arXiv.org:cond–mat/0206586.

Shore, B.W., 1990, *The Theory of Coherent Atomic Excitation* vol. 2, Wiley, New York, section 13.7.

Tian, L., S. Lloyd, 2000, "Resonant cancellation of off–resonant effects in a multilevel qubit," Phys. Rev. A 62, 050301.

Yu, Y., S. Han. X. Chu, S.–I Chu, Z. Wang, 2002, "Coherent Temporal Oscillations of Macroscopic Quantum States in a Josephson Junction," Science 296, 889–892.

Zagoskin, A.M., 1999, "A scalable, tunable qubit, based on a clean DND or grain boundary D–D junction," arXiv.org:cond–mat/9903170.

Zhou, Z.Y., S.–I Chu, S. Han, 2002, "Quantum computing with superconducting devices: A three–level Squid qubit," Phys. Rev. B 66, 054527.

$\delta = 0,$
$|u| = 1$

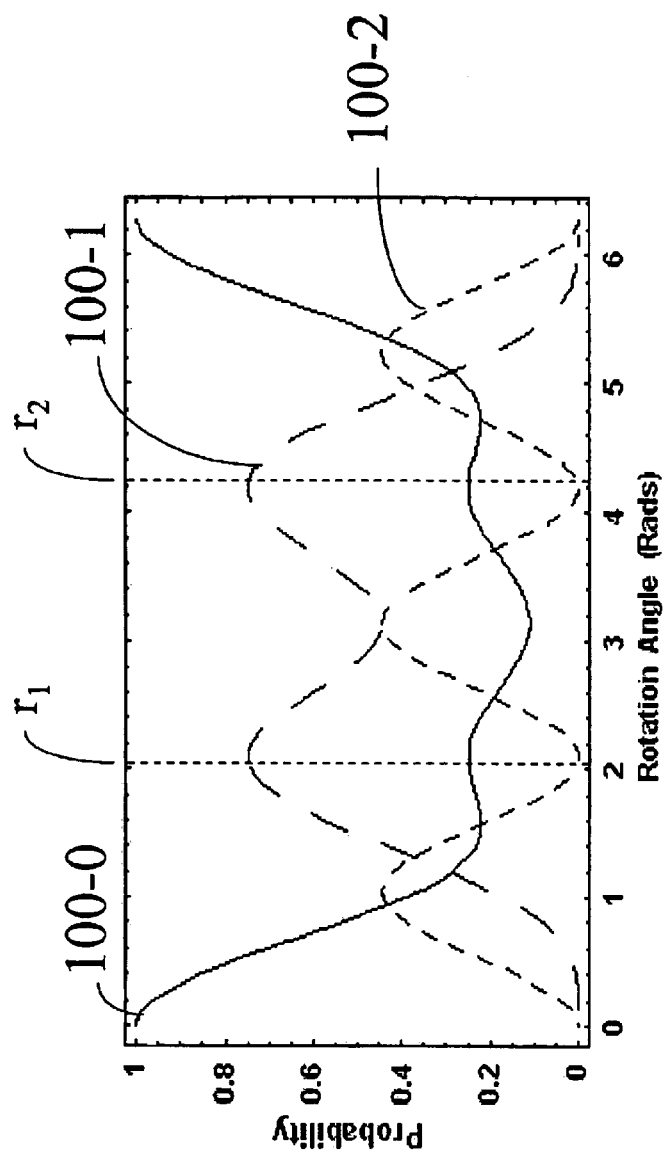

$$\delta = \sqrt{\frac{8}{3}} \cdot |u|,$$
$$|u| = 1$$

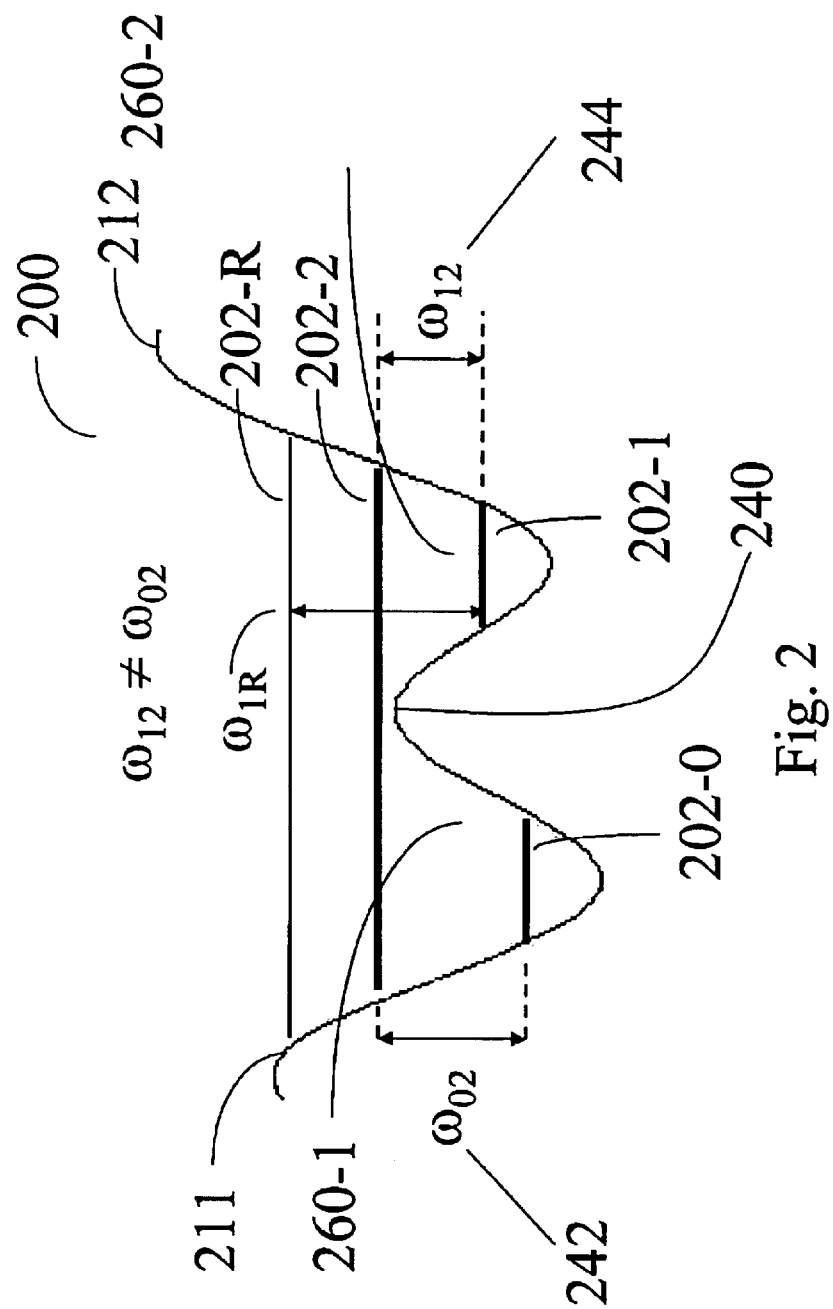

502 — Apply a first signal to a system having two pairs of degenerate energy levels for a time period 520. The signal has a frequency that is correlated with the energy difference between the first degenerate energy pair and the second degenerate energy pair.

504 — Discontinue the signal applied in step 502 and allow the system to evolve between basis states for a time period 530.

506 — Apply a third signal having the same characteristics as the signal applied in step 502 for a time period 540.

Fig. 5

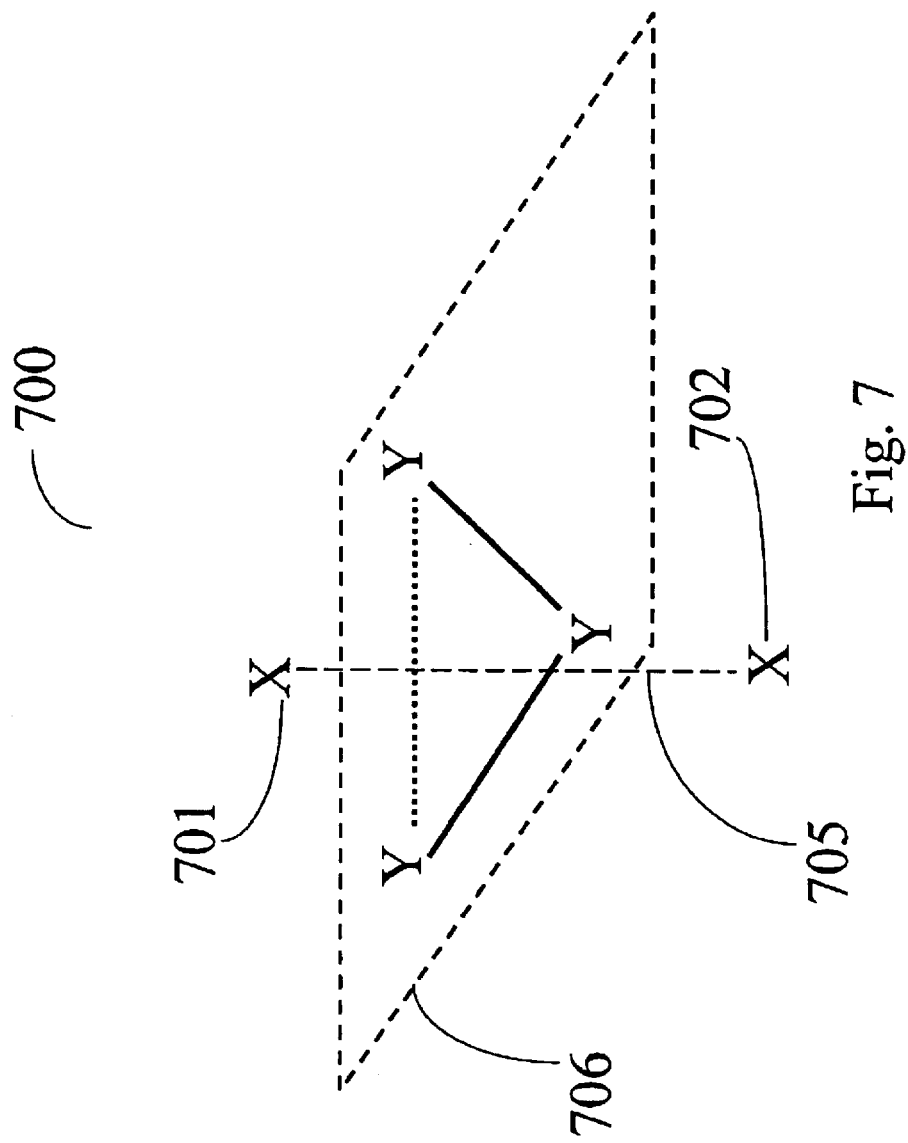

QUANTUM LOGIC USING THREE ENERGY LEVELS

1.0 CROSS REFERENCE TO RELATED APPLICATIONS

This application claims priority to U.S. Provisional Patent Application No. 60/429,170, entitled "Degenerate Level Qubit Operations," filed Nov. 25, 2002 and U.S. Provisional Patent Application No. 60/443,764, "Degenerate Level Qubit Operations," filed on Jan. 29, 2003, which are hereby incorporated by reference in their entireties.

1.0 FIELD OF THE INVENTION

The present invention relates generally to the field of quantum computing. More specifically the present invention relates to apparatuses suitable for use as qubits in a quantum computing system and methods of performing quantum computing with one or more qubits.

2.0 BACKGROUND

2.1 Qubits

A quantum bit or qubit is the building block of a quantum computer in the same way that a conventional binary bit is a building block of a classical computer. The conventional binary bit always adopts the values 0 and 1. The values 0 and 1 can be termed the states of a conventional bit. A qubit is similar to a conventional binary bit in the sense that it can adopt states as well. The states of a qubit are referred to as the $|0\rangle$ basis state and the $|1\rangle$ basis state. During quantum computation, the state of a qubit is defined as a superposition of the $|0\rangle$ basis state and the $|1\rangle$ basis state. This means that the state of the qubit simultaneously has a nonzero probability of occupying the $|0\rangle$ basis state and a nonzero probability of occupying the $|1\rangle$ basis state. The ability of a qubit to have a nonzero probability of occupying a first basis state ($|0\rangle$) and a nonzero probability of occupying a second basis state ($|1\rangle$) is different from a conventional bit, which always has a value of 0 or 1.

Qualitatively, a superposition of basis states means that the qubit can be in both basis states $|0\rangle$ and $|1\rangle$ at the same time. Mathematically a superposition of basis states means that the overall state of the qubit, which is denoted $|\Psi\rangle$, has the form $$|\Psi\rangle = \alpha|0\rangle + \beta|1\rangle$$

where $\alpha$ and $\beta$ are probability amplitudes. The terms $\alpha$ and $\beta$ each have real and imaginary components. Typically, when the state of a qubit is measured (e.g., read out), the quantum nature of the qubit is temporarily lost and the superposition of basis states collapses to either the $|0\rangle$ basis state or the $|1\rangle$ basis state, thus regaining its similarity to a conventional bit. The actual state of the qubit after it has collapsed depends on the probability amplitudes $\alpha$ and $\beta$ immediately prior to the readout operation.

2.2 Basic Requirements for Realizing Quantum Computing

The ability of a qubit to adopt a superposition of its basis states is one basis for the power harnessed by a quantum computer. However, in order to be useful in a quantum computer, the qubit must be combined with other qubits to form a quantum register. In fact, the capacity for a quantum register to represent information grows exponentially with the number of qubits in the quantum register. The computing power and nature of quantum computers are known and described in the art. See, e.g., Shor, U.S. Pat. No. 5,768,297, which is hereby incorporated by reference in its entirety.

In addition to the requirement of combining qubits into a quantum register, DiVincenzo sets forth a number of requirements necessary to realize a physical system that is capable of quantum computation. See DiVincenzo, in *Scalable Quantum Computers*, chapter 1, 2001, Wiley-VCH Verlag GmbH, Berlin, which is hereby incorporated by reference in its entirety. These requirements include the need to initialize the state of the qubits to a simple fiducial state, the need for long relevant decoherence times, a "universal set" of quantum gates, and qubit-specific measurement capability.

Qubits made using unconventional superconducting materials (e.g., d-wave superconductors) separated by clean Josephson junctions have been studied for their quantum computing potential. See, for example, U.S. Pat. No. 6,459,097 to Zagoskin, which is hereby incorporated by reference in its entirety. In a clean Josephson junction, the critical current ($I_c$) versus magnetic field (H) characteristic obeys a Fraunhofer-like behavior. See, for example, Nicolleti et al., 1996, Physica C, 269, p. 255, which is hereby incorporated by reference in its entirety. Because of the unique properties of d-wave materials, such devices possess a double well potential energy landscape. Each well in the double well potential energy landscape can serve as a basis state for a qubit. To better understand such devices, the properties of superconducting materials, double well potentials, and an example of a superconducting qubit having a double well potential will be described in the following sections.

2.3 Superconducting Materials

Superconductors, when cooled below a characteristic superconducting transition temperature, $T_c$, have the ability to transmit electric current without resistance. There are several types of superconducting materials, including s-wave (conventional superconductors) and d-wave (unconventional superconductors). To better explain the terms "unconventional superconductor" and "conventional superconductor," a brief review of the superconducting art is provided.

Conventional superconductors are described by Bardeen, Cooper, and Schrieffer ("BCS") theory, in which the superconducting electrons are paired in a zero net momentum and spin state by weak attractive interactions (weak-coupling approximation) between the electrons. It is held that the attraction between the electrons is mediated via the lattice vibrations (that is, phonons). These pairs of electrons are referred to as Cooper pairs. The relative orbital angular momentum of the Cooper pair can have a value of zero ("s-wave"), one ("p-wave"), two ("d-wave"), and so forth. A short range interaction can only lead to s-wave pairing. This simplest situation (s-wave pairing) is found in conventional (s-wave) superconductors.

A few years after BCS theory was formulated, Kohn and Luttinger examined the possibility of generating a weak residual attraction out of the Coulomb repulsion between electrons. They found that this attraction could occur in principle, but only for higher angular momentum, when the electrons in the Cooper pairs are prevented from close encounters by the centrifugal barrier. In certain "heavy-fermion" materials, e.g., uranium containing materials, superconductivity may be p-wave in nature. The term "unconventional superconductor" includes all superconducting states with any deviation from the ordinary BCS type of pairing. That is, materials in which the relative orbital angular momentum has a value other than zero (e.g., p-wave, d-wave materials).

Examples of unconventional superconducting materials include, but are not limited to, heavy fermions (e.g., $UPt_3$ and $URu_2Si_2$), $Sr_2RuO_4$ and the high-$T_c$ cuprates (e.g., $YBa_2Cu_3O_{7-x}$, $La_{1.85}Ba_{0.15}CuO_4$, $Tl_2Ba_2CuO_{6+x}$, and $Hg_{0.8}Tl_{0.2}Ba_2Cu_3O_{8.33}$). $YBa_2Cu_3O_{7-x}$ is also referred to as YBCO. Conventional superconducting materials include, but are not limited to, aluminum ($T_c$=1.175 K), niobium ($T_c$=9.25 K), and indium ($T_c$=3.4 K), where $T_c$ is the transition temperature of the material. That is, for temperatures above $T_c$, the material is not superconducting while for temperatures below $T_c$, the material can be superconducting.

2.4 Double Well Potential

Systems useful for quantum computing include devices and/or structures (e.g., qubits) that are described by a potential energy landscape that includes a double well potential. A double well potential 100 is depicted in FIG. 1A. Double well potential 100 describes, for example, the potential energy landscape (e.g., a series of quantized energy levels) of a qubit that has basis states |0>(100-0) and |1>(100-1). As such, states 100-0 and 100-1 (FIG. 1) represent the ground state energy levels of the system.

A double well potential typically has degenerate energy levels between each of the potential wells, such that the energy levels in different wells can have the same associated energy. In FIG. 1A, energy levels 100-0 and 100-1 are degenerate, and typically the potential wells can have many possible energy levels.

In double well potential 100, ground states 100-0 and 100-1 correlate with the phase states $+\Delta\phi$ and $-\Delta\phi$. Superconducting phase qubits are known in the art and are described, for example, in U.S. Pat. No. , 6,459,097 B1 to Zagoskin, and Amin et al., U.S. patent application Ser. No. 09/872,495, filed June, 2001, which are hereby incorporated by reference in their entireties.

2.5 An Exemplary System That has a Double Well Potential

Examples of systems that can have a double well potential are superconducting Josephson phase qubits. For example, U.S. Pat. No. 6,459,097 to Zagoskin describes superconducting Josephson phase qubits based on the degenerate ground states of supercurrent at d-wave/d-wave (DD) junctions. U.S. Pat. No. 6,459,097 to Zagoskin is hereby incorporated by reference in its entirety.

The basis states of the superconducting Josephson phase qubit coincide with the phase of the qubit. The phase of a phase qubit, is the superconducting phase of an island of superconducting material within the qubit, or the gauge invariant phase difference across a Josephson junction within the qubit. The d-wave superconducting material used in superconducting Josephson phase qubits exhibits an anisotropic order parameter that restricts supercurrent to one or more preferred directions within the material. These restricted directions are correlated with the orientation of the order parameter that is, in turn, correlated with the orientation of the crystal lattice of the d-wave materials used in the junction.

Because of the anisotropic order parameter, a Josephson junction formed out of d-wave superconducting materials can be designed to introduce a phase shift between the superconducting regions that they separate. In this way, a clean Josephson junction between two d-wave materials having mismatched orientations introduces a phase shift between the two materials.

Il'ichev et al. describes a system that includes a mesoscopic Josephson junction (0.5 and 0.7 micrometers) formed in a loop with a macroscopic Josephson junction. See Il'ichev et al., 2001, Physical Review Letters 86, 5369, FIG. 1, which is hereby incorporated by reference in its entirety. The system described in Il'ichev is used to explore properties of small Josephson junctions and details the experimental observation of a doubly degenerate ground state energy of the system. See Il'ichev et al., p. 1, second column, first complete paragraph.

The doubly degenerate ground state referred to in Il'ichev et al. is correlated with the respective phase shift across the mesoscopic Josephson junction. This doubly degenerate ground state results from the fact that, although the magnitude of the phase shift is fixed, the sign of the phase shift can be either positive or negative.

If a conventional Josephson junction (S—S) was used in the Il'ichev et al. structure rather than the unconventional (D—D) Josephson junction, there would be no phase shift. Thus, the resulting potential landscape versus phase for the system would have only a single potential well with a ground state (state of minimum energy) occurring at zero phase. However, when a finite (non-zero) phase shift is introduced, by using the Josephson junction described above (a D—D junction), the potential landscape versus phase forms a double well potential. This double well potential has a first minimum energy correlated with the positive phase difference and a second minimum energy correlated with the negative phase difference. Il'ichev et al. illustrates the free energy as a function of phase difference across the mesoscopic Josephson junction (weak link) and shows the formation of a double well energy structure with respect to phase. See FIG. 5 on page 4 of Il'ichev et al.

Il'ichev et al. states that, under certain misorientation angles (the degree of misalignment between the banks on each side of a grain boundary junction), the first harmonic for the Josephson current density of a Josephson junction between misaligned d-wave superconductors is suppressed and the second harmonic dominates the current. Il'ichev et al. further states that the suppression of the first harmonic and the dominance of the second harmonic leads to a doubly degenerate ground state for the junction. (Il'ichev et al., page 2, column 1, last sentence of the third paragraph).

2.6 The Universal Set of Quantum Gates Requirement

As discussed in Section 2.2, above, any physical system capable of quantum computation provides a universal set of quantum gates so that the state of each qubit in the physical system can evolve in a controlled manner. The minimum set of gates required to realize a universal set of quantum gates is set forth by DiVincenzo in *Scalable Quantum Computers*, Wiley-VCH, Berlin, 2001, Braunstein and Lo, eds; as well as Dodd et al., "Universal quantum computation and simulation using any entangling Hamiltonian and local unitaries," Phys. Rev. A 65, 040301R, 2002, which are hereby incorporated by reference in their entireties. In brief, a universal set of quantum gates includes single qubit operations as well as at least one two-qubit operation.

A single qubit is a vector $|\Psi>=a|0>+b|1>$ parameterized by two complex numbers, a and b, satisfying $|a|^2+|b|^2=1$.

Operations on a qubit must preserve this norm, and thus such operations are described by 2×2 matrices. Examples of 2×2 matrices include the Pauli matrices $$\sigma_1 \equiv \sigma_x \equiv X \equiv \begin{bmatrix} 0 & 1 \\ 1 & 0 \end{bmatrix}$$

$$\sigma_2 \equiv \sigma_y \equiv Y \equiv \begin{bmatrix} 0 & -i \\ i & 0 \end{bmatrix}$$

$$\sigma_3 \equiv \sigma_z \equiv Z \equiv \begin{bmatrix} 1 & 0 \\ 0 & -1 \end{bmatrix}$$

The Pauli matrices $\sigma_x$, $\sigma_y$, and $\sigma_z$ give rise to the rotation operations $R_X(\theta)$, $R_Y(\theta)$, and $R_Z(\theta)$, respectively. The rotation operations $R_X(\theta)$, $R_Z(\theta)$, and $R_Y(\theta)$ each apply a single qubit operation to the state of the qubit over an angle of rotation, or phase of evolution, $\theta$ of the quantum state of the qubit. See for, example, p. 174 of Nielsen and Chuang, 2000, *Quantum Computation and Quantum Information*, Cambridge University Press, Cambridge, UK which is hereby incorporated by reference in its entirety. The Pauli matrices can be used in combination to create desired qubit single qubit gates. One useful single qubit gate is the Hadamard gate:

$$H \equiv \frac{1}{\sqrt{2}} \begin{bmatrix} 1 & 1 \\ 1 & -1 \end{bmatrix}.$$

The Hadamard gate can be constructed for applications of the $R_X(\theta)$, and $R_Z(\theta)$, rotation operations.

2.7 The Single Qubit $R_X(\theta)$ Operation

When the phase of evolution is $\pi$, the $R_X(\pi)$ operation represents a NOT gate. The NOT gate is defined by its truth table, in which an initial qubit state $|\Psi_I\rangle = \alpha|0\rangle + \beta|1\rangle$, is converted the new state $|\Psi_F\rangle = \beta|0\rangle + \alpha|1\rangle$. That is, application of $R_X(\pi)$ to a qubit that is entirely in the $|0\rangle$ basis state will cause the qubit to shift entirely to the $|1\rangle$ basis state. Similarly, application of $R_X(\pi)$ to a qubit that is entirely in the $|1\rangle$ basis state will cause the qubit to shift entirely to the $|0\rangle$ basis state.

When the phase of evolution is $\pi/2$, the $R_X(\pi/2)$ operation represents half a NOT gate. When the phase of evolution is $\pi/3$, the $R_X(\pi/3)$ operation represents a third of a NOT gate. When the rotation angle of a single qubit gate can be continuously varied the type of single qubit operation can be continuously varied.

2.7.1 Achieving the $R_X(\theta)$ Operation by Tunneling

In one implementation, the $R_X(\theta)$ operation has been realized in a system having a double well potential and a natural tunneling element. In this implementation, a system having a double well potential where the barrier separating each of the potential wells is relatively small is required. The relatively small barrier is needed so that the probability for the state of the system to tunnel through the barrier will be greater than zero. Tunneling of the state of a system is a well-known effect in quantum mechanics.

In classical mechanics, for a particle occupying a ground state to move to another state (e.g., another ground state in a degenerate system), the particle must possess more potential energy than the energy barrier that separates the two states. However, if the particle is governed by quantum mechanics, it is possible for the particle to tunnel through the potential barrier separating the two states even when the particle does not have sufficient potential energy to pass over the potential energy barrier separating the two states. See, for example, Atkins, 1983, *Molecular Quantum Mechanics*, Oxford University Press, New York, pp. 41–44. Atkins explains that a particle (e.g., a Cooper pair) may be found inside a classically forbidden region (forbidden because the particle does not have sufficient potential energy to be in the region). Atkins calls this effect "penetration of the barrier" or "tunneling."

In this implementation of an $R_X(\theta)$ operation, the qubit oscillates between information states (basis states or two superposition states) at a given frequency correlated with the probability for the state of the system to tunnel under the barrier. The $R_X(\theta)$ operation occurs unprompted by outside signals, with the magnitude of the phase evolution $\theta$ (or angle of rotation) of this $R_X(\theta)$ operation proportional to the time it is left isolated. This results in a system that undergoes undesired evolution when it is isolated. Because of this undesired evolution, a scheme for applying pulses to recouple the information in the system is required. Recoupling can be implemented using known procedures. See Lidar et al. U.S. patent application Ser. No. 60/370,087, which is hereby incorporated by reference in its entirety.

Although $R_X(\theta)$ operations that make use of a natural tunneling element are functional, they are unsatisfactory in practice because the recoupling schemes necessary to prevent undesired evolution require additional resources, increasing the cost of the quantum computing system. Therefore, quantum computing systems that implement $R_X(\theta)$ operations by relying on tunneling between the basis states of a qubit are complicated to make and use because of the need to implement schemes to recouple the information in the system after application of the $R_X(\theta)$ operation.

2.7.2 Attempting to Implement an $R_X(\theta)$ Operation in a Double Well Potential System Using an External Signal In a second implementation, $R_X(\theta)$ has been attempted in a system having a double well potential by application of a high frequency alternating signal to excite the system to an energy level above the middle barrier (110 of FIG. 1A). In the second implementation, the high frequency alternating signal flips the information state of the system from $|0\rangle$ to an energy level above the center barrier, referred to as $|4\rangle$ in FIG. 1 on p. 054527-2 of Zhou et al., 2002, Phys. Rev. B, 66, 054527-1, which is hereby incorporated by reference in its entirety.

In a second step, a second high frequency alternating signal is applied to flip the information state from the energy level labeled $|4\rangle$ to the energy level $|1\rangle$. Although the Zhou et al. system does not require schemes to recouple the information in the system after application of the $R_X(\theta)$ operation, the system has its own drawbacks. The Zhou et al. system has no $R_X(\theta)$ dynamics when isolated. Further, the Zhou et al. system does not implement a single qubit gate that can be used for universal quantum computation. Unlike a tunneling operation, implementation of the NOT scheme of Zhou et al. is irreversible and does not function for a superposition of states.

2.7.3 Attempting to Implement an $R_X(\theta)$ Operation in a Double Well Potential System Using a Switchable Electric Field In a third implementation, $R_X(\theta)$ has been attempted in a system having three energy levels. Two of the three energy levels may have about the same energy and the third energy level, denoted $|c\rangle$, is greater than the other two. Such a system is illustrated in FIG. 8 and further described in Barone et al., "Quantum Computational Gates with Radiation Free Couplings," ArXiv.org cond-mat/0203313, (e.g., FIG. 1) which is hereby incorporated by reference in its entirety. In the third implementation, no high frequency alternating signal is applied. This flips the information state of the system from $|0\rangle$ to the $|c\rangle$ energy level.

Barone et al. uses radiation free couplings to perform limited forms of quantum logic gates. The operations are defined as static interactions between the first two levels and the third higher energy level. The Barone et al. system includes a normal metal (i.e., non-superconducting) ring interrupted by a plurality of insulating layers threaded by a static magnetic flux. In particular, Barone et al. uses a transverse electric field applied to a normal metal ring that is interrupted by a plurality of insulating layers in order to generate a discrete set of gates. Barone et al. do not use electro-magnetic radiation to effect qubit operations. While Barone et al. does make use of the third energy level, they do not create a set of gates that have a continuous angle of rotation, θ, with respect to the quantum state of the qubit.

Given the above background, what is needed in the art are improved systems and methods for implementing an $R_X(\theta)$ operation. Such systems and methods are necessary in order to provide devices that possess all the requirements necessary to perform quantum computing in a cost-effective manner.

3.0 SUMMARY OF THE INVENTION

The present invention addresses the problems found in the prior art. One embodiment of the present invention provides apparatus and methods capable of implementing an $R_X(\theta)$ operation using a tunneling scheme without expensive recoupling schemes. Another embodiment overcomes the limitations of the Zhou et al. system so that it may be used to implement an $R_X(\theta)$ operation. Thus, the present invention provides systems and methods that implement single qubit operations in a more cost effective and efficient manner. Such systems and methods are therefore useful in important fields such as quantum computing.

One embodiment provides a method for quantum computing with a quantum system comprising a first energy level, a second energy level, and a third energy level. The first energy level and the second energy level are capable of being degenerate with respect to each other. The method comprises applying a signal having an alternating amplitude to the quantum system. The frequency of the signal correlates with (i) an energy level separation between the first energy level and the third energy level or (ii) an energy level separation between the second energy level and the third energy level. The signal induces an oscillation in the state of the quantum system between the first energy level and the second energy level. In some embodiments, the first energy level and the second energy level form the basis states of a qubit. As used herein, a quantum system is any system that adheres to the laws of quantum mechanics.

Another embodiment provides a method for quantum computing with a quantum system having a first pair of degenerate energy levels and a second pair of degenerate energy levels. The method comprises applying a first signal having an alternating amplitude for a first time period to the quantum system. The frequency of the first signal correlates with the energy level separation between an energy level in the first pair of degenerate energy levels and an energy level in the second pair of degenerate energy levels. The method further comprises allowing the system to evolve freely for a second time period. The method additionally comprises reapplying said first signal for a third time period. In some embodiments, the third time period is the same as the first time period.

Another embodiment provides a method for quantum computing with a quantum system comprising a first energy level, a second energy level and a third energy level. The method comprises inducing oscillations in the state of the quantum system between the first energy level and second energy level by:

(i) applying a first signal having an alternating amplitude to the quantum system for a first time period, wherein the frequency of the first signal correlates with an energy level separation between the first energy level and the third energy level, (ii) applying a second signal having an alternating amplitude to the quantum system for a second time period, wherein the frequency of the second signal correlates with an energy level separation between the second energy level and the third energy level; and (iii) reapplying the first signal to the quantum system for a third time period, wherein the frequency of the signal correlates with the energy level separation between the first energy level and the third energy level.

Yet another embodiment provides a method for performing a readout operation of a quantum system having a first energy level, a second energy level, and a third energy level. The third energy level has a measurable escape path. The method comprises applying a signal having an alternating amplitude to the quantum system. The frequency of the signal correlates with the energy level separation between the first energy level and the third energy level. The method further comprises determining when the system has escaped the third energy level through the measurable escape path.

Still another embodiment of the present invention comprises a qubit that includes a Josephson junction formed by the intersection of a first bank of unconventional superconducting material and a second bank of unconventional superconducting material. The basis states of the qubit are represented by the degenerate ground state energy levels of the Josephson junction.

Other embodiments of the present invention include a qubit comprising a molecule having a first and a second ground state, the ground states corresponding to energy levels in a double well energy potential having an associated tunneling amplitude. A Rabi oscillation between the first basis state and second basis state of the molecule is induced. The tunneling amplitude, expressed in frequency units, is less than the frequency of the Rabi oscillation. In some of these embodiments, the tunneling amplitude, expressed in frequency units, is approximately equal to or less than the arithmetic inverse of a decoherence time associated with the qubit. In some of these embodiments, the molecule is comprised of a chemical entity (e.g., compound) comprising an element that is in a reduced state (e.g., the element is hydrogenated with two or more hydrogen atoms). In some of these embodiments, the molecule is of the form $XY_3$ where X is an atom such as arsenic, or phosphorus, and wherein each Y is the same or different and is independently selected from the group consisting of hydrogen, deuterium, and tritium. In some of these embodiments, the chemical entity is arsine ($AsH_3$) or phosphine ($PH_3$).

4.0 BRIEF DESCRIPTION OF THE FIGURES

FIG. 1D illustrates the evolution of a system as a probability of the occupation of the system states with respect to the rotation angle or period of evolution, in accordance with one embodiment.

FIG. 2 illustrates a biased double well potential in accordance with one embodiment.

FIG. 5 illustrates a pulse sequence in accordance with one embodiment.

FIG. 7 illustrates a microscopic system capable of supporting a double well potential, in accordance with various embodiments.

Like reference numeral refer to corresponding parts throughout the several views of the drawings.

5.0 DETAILED DESCRIPTION

The present invention provides multiple embodiments. A first aspect of the invention is applicable to systems described by a degenerate double well potential (FIG. 1B) in which signal is applied. It was an unexpected discovery of the present invention that the applied signal in the presence of a selected auxiliary level is sufficient for coherent control of a qubit. The external signal may be used to apply an $R_X(\theta)$ operation in systems described by a degenerate double well potential. This aspect of the invention is described in Section 5.1 below.

A second aspect of the invention extends the work of Zhou et al. so that an $R_X(\theta)$ operation may be efficiently performed on systems having a biased (nondegenerate) double well potential. In this second aspect of the invention, a third pulse is used to achieve a proper $R_X(\theta)$ [quantum NOT] operation. This aspect of the invention is described in Section 5.2, below. A third aspect of the invention applies quantum gates in quantum systems that have two or more pairs of degenerate energy levels. This aspect of the invention is described in Section 5.3, below.

A fourth aspect of the invention describes an $R_X(\theta)$ operation that can be efficiently performed on systems for a continuous range of rotation angles θ. In this fourth aspect of the invention, detuning of pulse or variation of amplitudes of in-pulse sequences is used to effect an $R_X(\theta)$ that is a proper quantum NOT operation. This aspect of the invention is described, for example, in Sections 5.1 and 5.2, below.

5.1 $R_X(\theta)$ Operation in Systems Described by a Degenerate Potential Well In one aspect of the present invention, $R_X(\theta)$ operations are performed on systems described by a degenerate double well potential 190 (FIG. 1B) by creating dynamics in the system that reproduce the effect of a tunnel matrix element. Such systems have at least three energy levels, at least two of which are degenerate (i.e., have the same energy value).

Figure 1A:
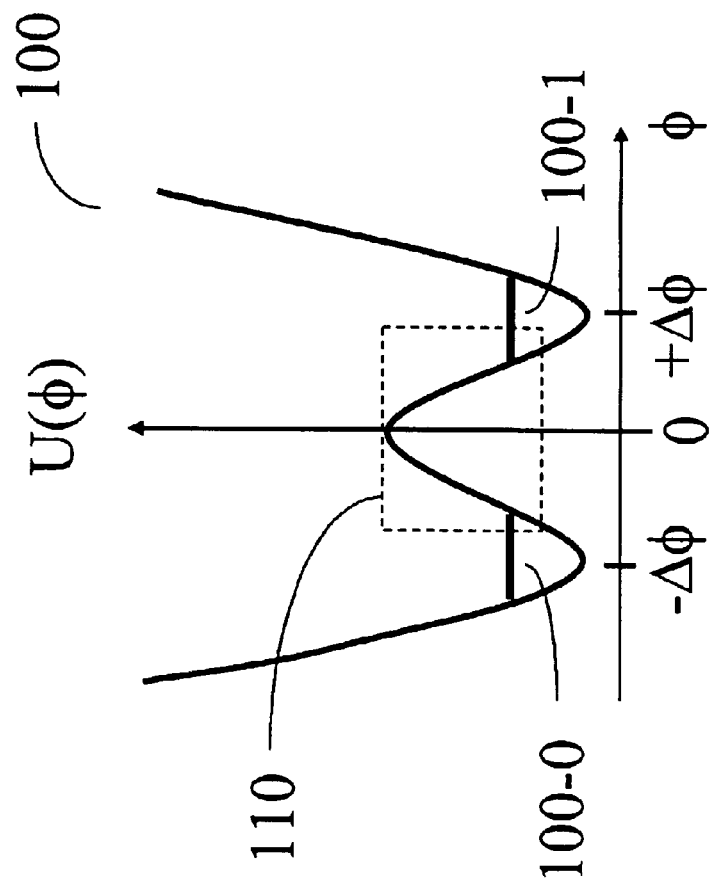
FIG. 1A illustrates a double well potential in accordance with the prior art.
Figure 1B:
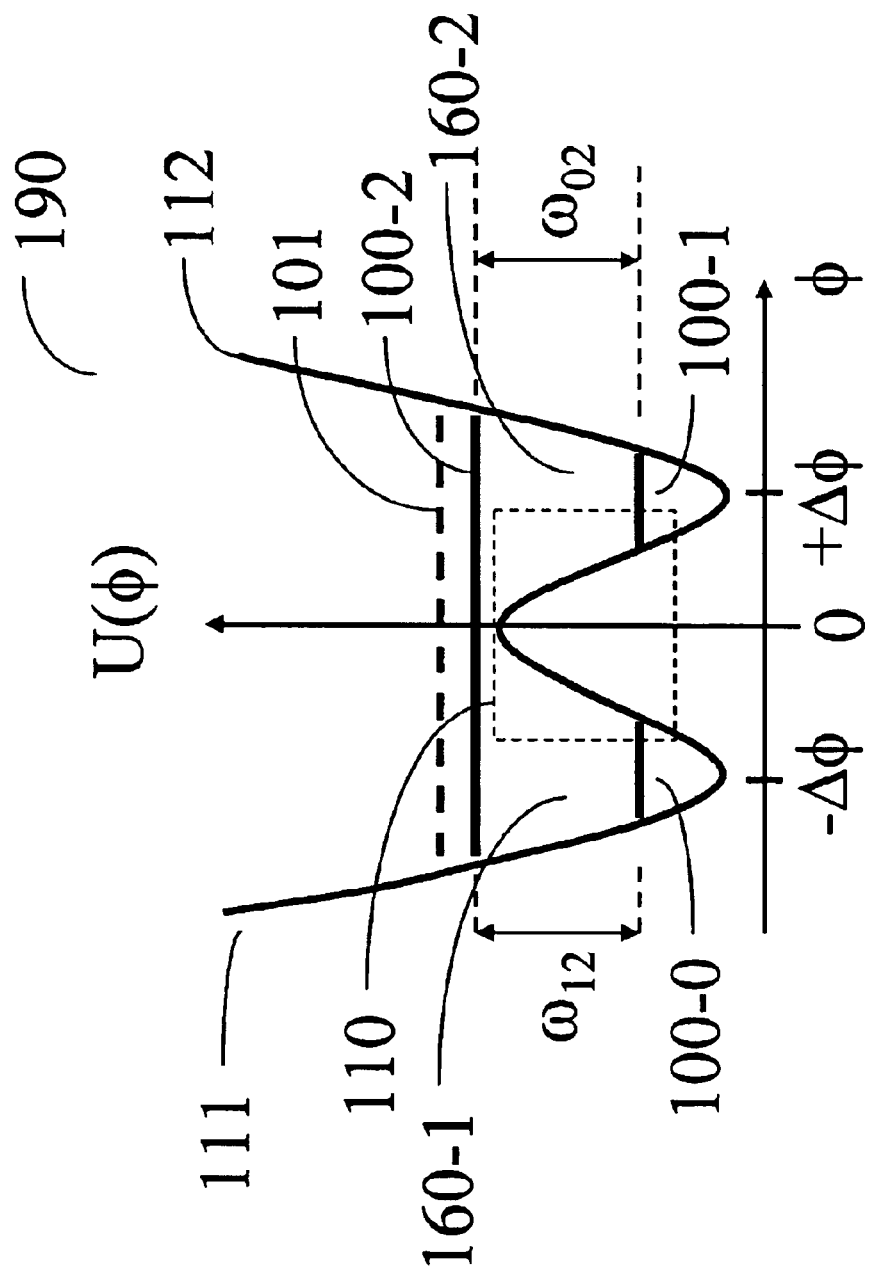
FIG. 1B illustrates a double well potential in accordance with one embodiment.

For example, in one embodiment, the system has degenerate quantized energy levels 100-0 and 100-1 separated by energy barrier 110 (FIG. 1B). Degenerate quantized levels 100-0 and 100-1 are isolated by larger energy barriers 111 and 112. The system further includes quantized energy level 100-2 that is at an energy level greater than that of barrier 110. In FIG. 1B, energy level 100-2 is depicted as the next energy level above barrier 110. However, in practice, energy level 100-2 is any energy level above barrier 110 that is constrained by barriers 111 and 112. Thus, there is no requirement that energy level 100-2 be the next energy level above barrier 110.

The energy levels that fall below barrier 110 are doubled. Therefore, in systems in accordance with this aspect of the present invention, each energy level below barrier 110 in well 160-1 (FIG. 1B) has a corresponding level in potential well 160-2 with the same energy level. FIG. 1B depicts one such set of degenerate energy levels, 100-0 and 100-1. However, it is possible for systems in accordance with this aspect of the invention to have more than just one set of degenerate energy levels in potential energy wells 160-1 and 160-2.

Physically, when a system in accordance with this aspect of the invention is in its ground state, it occupies the lowest energy levels or ground state energy. In FIG. 1B, degenerate energy levels 100-0 and 100-1 represent the ground state energy of potential wells 160-1 and 160-2. For operation of a system described by potential energy diagram 190 (FIG. 1B) as a qubit, ground state energy levels 100-0 and 100-1 are typically treated as the basis states, denoted |0> and |1>.

In this aspect of the invention, an alternating signal is applied to a system described by potential energy diagram 190 (FIG. 1B). These transitions can be treated as an implementation of $R_X(\theta)$ and hence can be used to realize universal quantum computing. More specifically, when an alternating signal having a frequency that depends on the energy difference between energy levels (states) 100-2 and 100-1 is applied to the system, the system state will undergo Rabi oscillations between energy levels 100-0 and 100-1. Here, the energy difference between energy levels 100-2 and 100-1 is the same as the energy difference between energy levels 100-2 and 100-0 because they are degenerate (i.e., they have the same energy). The frequencies $\omega_{02}$ and $\omega_{12}$ depend on the respective energy level difference as $\omega_{02}=(E_{100-2}-E_{100-0})$ and $\omega_{12}=(E_{100-2}-E_{100-1})$, where $\hbar=1$ throughout the present invention, as one of skill in the art will realize that $\hbar$ can be multiplied onto any angular frequency variable in order to get the corresponding energy value with correct unit conversion. The notation $E_{100-X}$ refers to the energy of energy level 100-X.

Figure 1C:
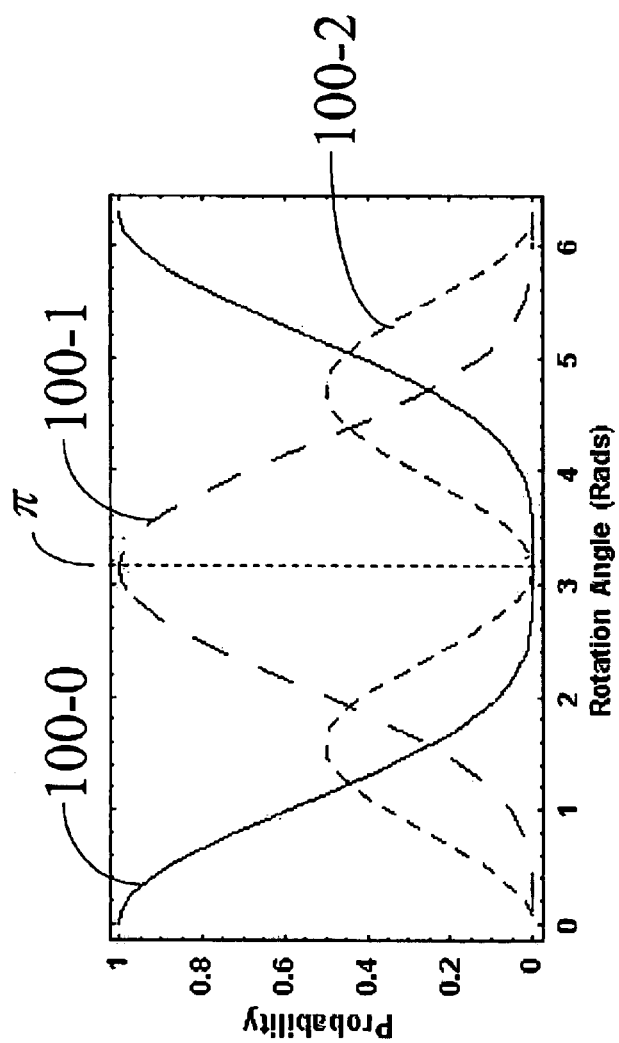
FIG. 1C illustrates the oscillation of the state of a system, as a probability of energy level population, as a function of rotation angle during application of an alternating signal, in accordance with one embodiment.

Unexpectedly, it has been determined that the applied alternating signal will cause the state of the system to oscillate between the ground state energies 100-0 and 100-1 and the excited energy state 100-2 (FIG. 1B) at frequencies that are determined, in part, by the amplitude (i.e., square root of power) of the applied signal. To illustrate, consider the case in which a qubit is in an initial state |0> (e.g., the qubit is in state 100-0 of FIG. 1B). FIG. 1C illustrates the oscillation of the state of the system (as a probability of energy level population) as a function of rotation angle during application of the alternating signal. As illustrated, the system begins in state |Ψ>=|0> at t=0, and evolves as a superposition of the three respective states (states 100-0, 100-1 and 100-2). The evolution of the state |Ψ> of the system is shown in FIG. 1C. As illustrated by the curves in FIG. 1C, after a time period equal to π, the system is entirely in the state |Ψ>=|1> and after a time period equal to 2π, the system is again back to the initial state of |Ψ>=|0>. In between these time periods, the state of the system occupies a superposition of all of the energies, having a state |Ψ>= α|0>+β|1>+γ|2>, where each of the curves provides the square of the respective component. The time in seconds for these periods (e.g., the period corresponding to π and the period corresponding to 2π) depends on factors such as the amplitude of the applied signal and the magnitude of the energy difference between the degenerate states and the |2> state. Thus, it is clear that application of an alternating signal having a frequency that correlates with the energy difference between energy levels 100-2 and 100-0 or between energy levels 100-2 and 100-1 (FIG. 1B) will cause the system to oscillate between the respective energy levels.

In the example above, the initial state of the system was |0>. However, the inventive method is not limited to doubly degenerate quantum systems that are fully in a |0> (FIG. 1B, 100-0) basis state. Indeed, the inventive method may be applied to any doubly degenerate quantum system having an initial state that is in a superposition of two basis states |0> (100-0, FIG. 1B), and |1> (100-1, FIG. 1B) and is described by the potential energy diagram shown in FIG. 1B.

The duration of the respective period (e.g., the period corresponding to π or the period corresponding to 2π) is application dependent. In some embodiments, the Rabi frequency $\Omega_R$ (i.e. the frequency of an applied signal that induces an oscillation between the basis states and the |2> state) is in the range of about 1 mega-Hertz (MHz) to about 1 giga-Hertz (GHz), corresponding to a Rabi period in the range of about 1 micro-second (μs) to about 1 nano-second (ns). In some embodiments the Rabi frequency $\Omega_R$ is in the range of about 1 MHz to about 500 MHz, corresponding to a Rabi period of about 1 μs to about 2 ns. In the example illustrated in FIG. 1C, the π evolution can correspond to a duration in the range of about 0.5 μs to about 0.5 ns.

Referring to FIG. 1C, the respective $R_X(\theta)$ operation has a minimum phase (equivalently a minimum period) of evolution of π. The minimum period of evolution is defined as the first point at which the system is entirely in the basis or information states. In some cases, the minimum period of evolution required to implement a quantum algorithm on a quantum computer is less than that illustrated in FIG. 1C. In an embodiment of the present invention it is possible to make the minimum period of phase evolution for the $R_X(\theta)$ operation smaller than π.

The present invention is not limited to applications in which the frequency of the applied signal depends exactly on the respective energy level differences $(E_{100-2}-E_{100-0})$ and $(E_{100-2}-E_{100-1})$, where $\hbar=1$. In some embodiments, the applied signal can be detuned. Referring to FIG. 1B, detuning is represented by the pseudo energy level 101. In an embodiment of the present invention, pseudo energy level 101 is a distance δ away from energy level 100-2. The magnitude of the de-tuning is represented as $\delta \div \Omega_R \times 100\%$, where $$\Omega_R = \sqrt{\delta^2 + \Omega_0^2}$$

and $\Omega_0^2 = u^2 + v^2$ is the Rabi frequency for an applied signal between energy levels 100-0 and 100-2 or 100-1 and 100-2, and ranges from about 0% to an unbounded upper limit. The symbol u refers to the coupling between energy levels 100-0 and 100-2, and the symbol v to the coupling between the energy levels 100-1 and 100-2. Both u and v are off-diagonal terms in the Hamiltonian.

$$\tilde{H} = \begin{bmatrix} \delta_0 & 0 & u^* \\ 0 & \delta_1 & v^* \\ u & v & 0 \end{bmatrix}$$

Further embodiments of the present invention have detuning magnitudes ranging from about 2 percent to about three hundred percent. Furthermore, certain embodiments of the present invention include specific detuning values selected from the group consisting of about −50%, −25%, 25%, 50%, 100%, 200% or greater. As used here the term "about" means ±5% in one embodiment, ±10% in another embodiment, and ±20% in still another embodiment. In some embodiments, δ is about the same as the Rabi frequency, and can have values ranging from about 1 MHz to about 1 GHz. These detuning values allow for the state of the system to evolve to any desired superposition of basis states: |Ψ>=α|0>+β|1>, depending on both the magnitude of the detuning as well as the duration of the applied signal.

FIG. 1D illustrates the evolution of the system as a probability of the occupation of the system states with respect to the rotation angle or period of evolution. The detuning level is illustrated as $\delta=0.5*|u|$, where |u| represents the effect of the applied alternating signal on the system. The only difference between FIGS. 1C and 1D is that the term $\delta \neq 0$ has been introduced. The system now has two rotation angles when the population in the non-information state (state 100-2 from FIG. 1B) is zero. Starting from an initial condition that the system is in the state |Ψ>=0>, after an evolution $r_1$, which corresponds to 2π/3 in FIG. 1D, the system is in a superposition of the states 100-0 and 100-1. This superposition of states is |Ψ>=α|0>+β|1>, where α≈0.75 and β≈0.25. After a complete period, the system returns to the initial state |0>.

Figure 1E:
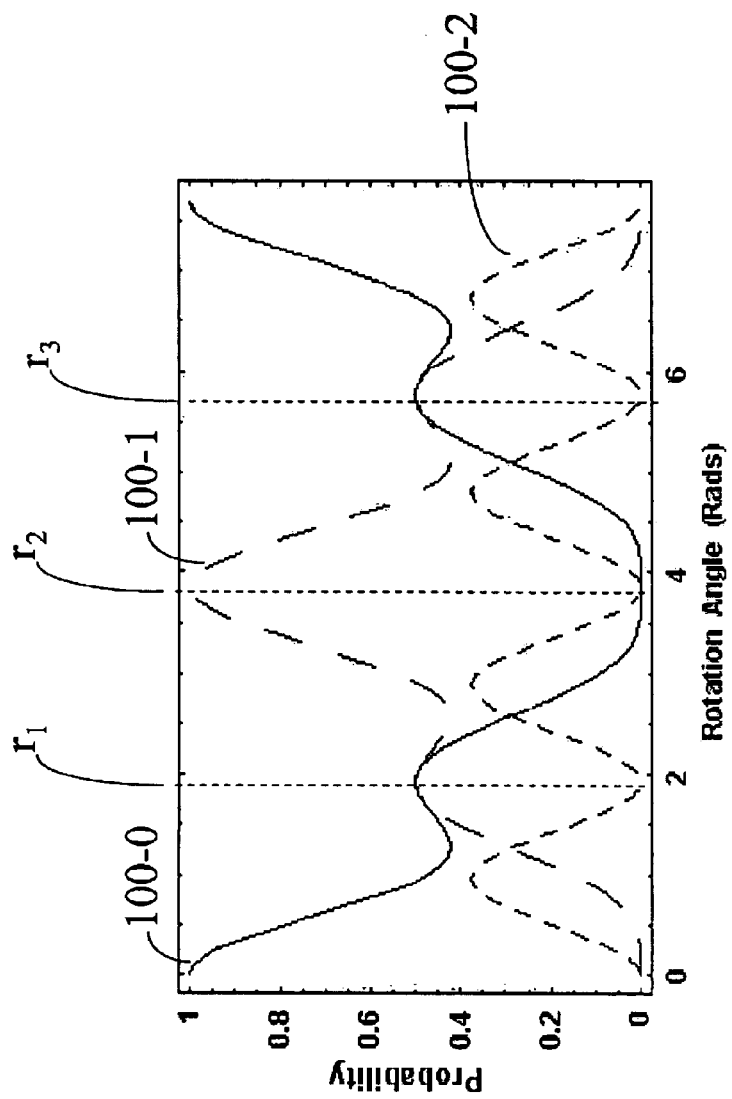
FIG. 1E illustrates the evolution of a system as a probability of the occupation of the system states with respect to the rotation angle or period of evolution, in accordance with one embodiment.

FIG. 1E illustrates the same situation as FIGS. 1C and 1D, with the exception that the detuning is $$\delta = \sqrt{\frac{8}{3}} |u|,$$

where |u| characterizes the effect of the applied alternating signal. The behavior illustrated in FIG. 1E shows that, for this value of detuning, the system implements a quantum NOT operation. Once again the initial state of the system is |Ψ>=|0>, and after an evolution $r_1$, the energy level 100-2 has zero population and the basis states 100-0 and 100-1 are in an equal superposition. In other words, at the rotation angle $r_1$, the state of the system has a magnitude $$|\Psi\rangle = \frac{|0\rangle + |1\rangle}{\sqrt{2}},$$

such that the system has an equal probability of occupying either energy level 100-0 or 100-1. After some further evolution $r_2$, the state of the system becomes |Ψ>=|1>, and the system is entirely in the 100-1 state. At this point $r_2$, the quantum NOT logic can be confirmed by noticing that the evolution has flipped the state of the system Thus, having δ at the above value is useful for some embodiments. Persons of skill in the art would recognize that the value of detuning can be controlled to achieve an arbitrary desired evolution of the qubit.

5.2 $R_X(\theta)$ Operation in Systems Described by a Biased Potential Well

As detailed in Section 2.6.2, above, Zhou et al. describes a non-degenerate double well system 200 (FIG. 1B) in which a NOT operation is performed. The Zhou et al. NOT operation requires three energy levels. The first energy level 202-0 and the second energy level 202-1 are typically the respective lowest energy levels in potential wells 260-1 and 260-2 while the third energy level (202-2) is above a barrier 240 that separates potential wells 260-1 and 260-2. As illustrated in FIG. 2, energy levels 202-0 and 202-1 are non-degenerate in the Zhou et al. system. This means that they adopt different energy values.

In Zhou et al, there is an energy difference $E_2-E_0$ between energy levels 202-0 and 202-2. Likewise, there is an energy difference $E_2-E_1$ between energy levels 202-1 and 202-2. Energy differences $E_2-E_0$ and $E_2-E_1$ respectively correspond to frequencies $\omega_{02}$ (FIG. 2, element 242) and $\omega_{12}$ (FIG. 2, element 244). In Zhou et al., $\omega_{02}$ does not equal $\omega_{12}$ because energy levels 200-0 and 200-1 are not degenerate.

When an alternating signal having an amplitude and frequency correlated with $\omega_{02}$ is applied to the Zhou et al. system (FIG. 2), the state of the system oscillates between the 202-0 and 202-2 energy levels. Similarly, when an alternating signal having an alternating amplitude and frequency correlated with $\omega_{12}$ is applied to the Zhou et al. system, the state of the system oscillates between the 202-1 and 202-2 energy levels.

Zhou et al. proposed the application of a series of two pulses to achieve a quantum operation. The pulse sequence consists of a first pulse, having a frequency of $\omega_{02}$ and applied for a duration $\Omega_{R0}$ ($\pi/2$), and a second pulse, having a frequency of $\omega_{12}$ and applied for a duration $\Omega_{R1}$ ($\pi/2$). Durations $\Omega_{R1}$ ($\phi$) and $\Omega_{R2}$ ($\phi$) represent a phase evolution of $\phi$ of the respective state of the system while the system is undergoing Rabi oscillations. A Rabi oscillation is characterized as an oscillation of the system between energy levels under the influence of an applied alternating signal. Rabi oscillations occur when the applied signal has a frequency $\omega_R = E_N - E_M$, where N and M are the respective energy levels between which the system will oscillate and $\hbar=1$ for convenience. When this signal is applied, the system will undergo Rabi oscillations with a frequency $\Omega_R$.

More specifically, Zhou et al. propose a quantum operation in which a system is first initialized to the |0> state. In other words, the system is first initialized so that it occupies the |0> state (202-0, FIG. 2). Then, in accordance with Zhou et al., a first pulse is applied to the system. This first pulse causes the state of the system to shift to |2> (FIG. 2, 202-2). Next, in accordance with Zhou et al., a second pulse is applied to the system. The second pulse causes the state of the system to shift to |1> (FIG. 2, 202-1).

As discussed in Section 2.6.2 above, a critical limitation of the operation proposed by Zhou et al. is that the system must start in the |0> (FIG. 2, 202-0) state. Because the Zhou et al. operation does not allow the system to be in any arbitrary superposition of two basis states (any arbitrary superposition of energy levels 202-0 and 202-1), it cannot be considered a $R_X(\pi)$ [quantum NOT] operation.

Figure 3:
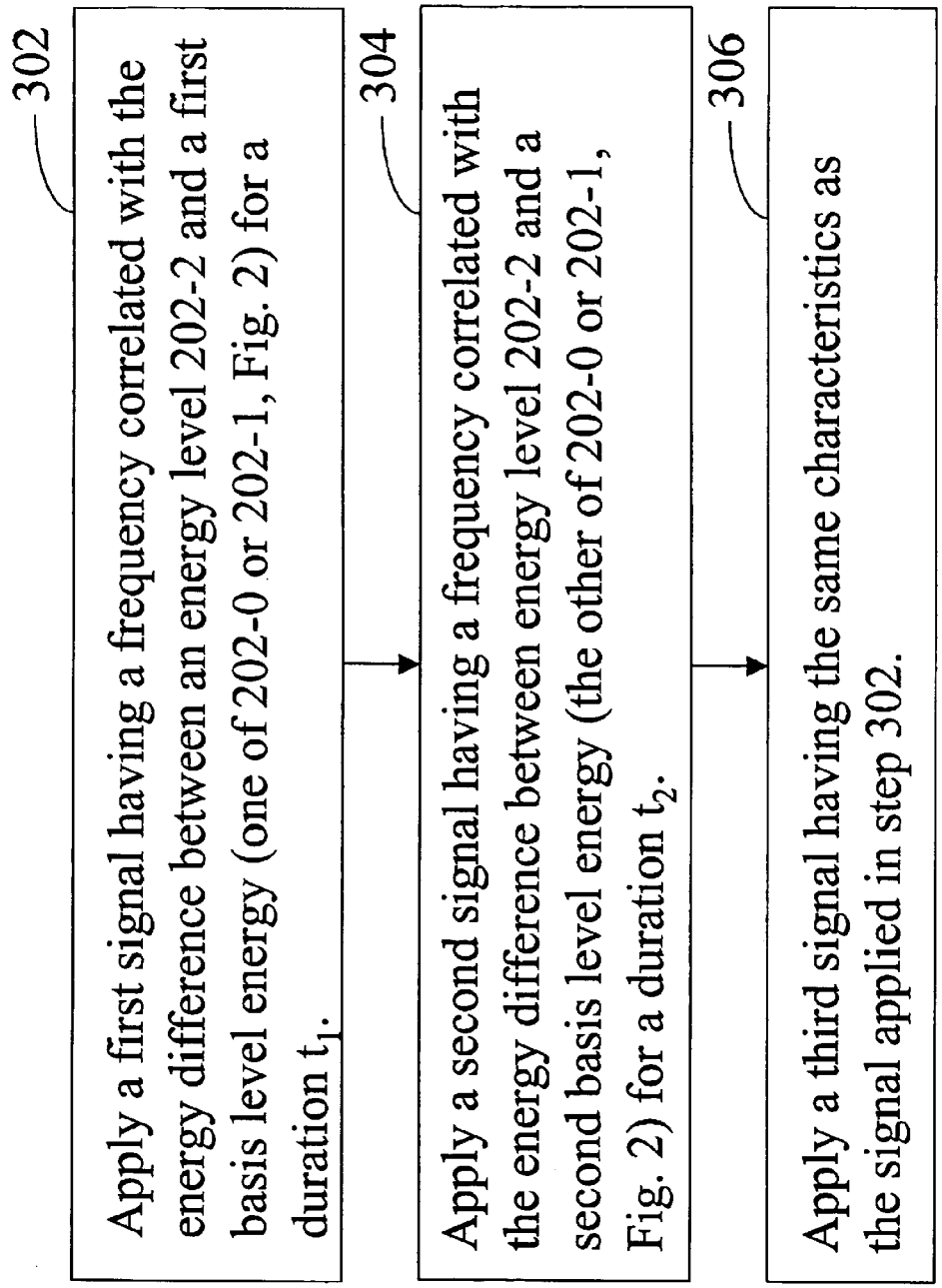
FIG. 3 illustrates a pulse sequence in accordance with one embodiment.

An embodiment of the present invention overcomes the limitations of Zhou et al. In this embodiment, a quantum NOT operation is applied to a system having a non-degenerate double well potential energy landscape illustrated in FIG. 2 using the algorithm illustrated in FIG. 3. A first signal is applied in step 302 (FIG. 3). The first signal has a frequency that depends on the energy difference between an energy level 202-2 (FIG. 2) and a first basis level (one of energy level 202-0 or 202-1 of FIG. 2) for a duration $t_1$.

A second signal is applied in step 304 (FIG. 3). The second signal has a frequency that depends on the energy difference between energy level 202-2 and a second basis energy level (the other of energy level 202-0 or 202-1 of FIG. 2). The second energy level is applied for a duration $t_2$. For example, if the frequency applied in step 302 depends on the difference in the 202-2 and the 202-0 energy levels, then the frequency applied in step 304 depends on the difference between the 202-2 and 202-1 energy levels. Each of the applied frequencies can be slightly out of resonance with the respective energy level difference to within the linewidth of the respective energy levels. Otherwise, a detuning effect will occur and other factors will have to be included in the gate action to determine its effect on the state of the system.

A third signal is applied in step 306. The signal applied in step 306 has the same characteristics and duration as the signal applied in step 302 (FIG. 3). An advantage of the novel pulse sequence illustrated in FIG. 3 is that the sequence performs a quantum NOT [$R_X(\pi)$] operation on a system described by the non-degenerate potential energy landscape (FIG. 2) irrespective of the initial state of the system. An arbitrary initial state of a system having the potential energy landscape illustrated in FIG. 2 is $\alpha|0>+\beta|1>+0|2>$, where $\alpha$ and $\beta$ are complex numbers, |0> is the 202-0 energy level, |1> is the 202-1 energy level, and |2> is the 202-R energy level. When pulse 302 is applied for the appropriate duration, the state $\Psi$ of the system becomes either:

$$|\Psi_1>=0|0>+\beta|1>+\alpha|2>$$

or:

$$|\Psi_1>=\alpha|0>+0|1>+\beta|2>.$$

After signal 304 is applied for the appropriate duration the state of the system, denoted $|\Psi_2>$, becomes:

$$|\Psi_2>=0|0>+\alpha|1>+\beta|2>$$

or $$|\Psi_2>=\beta|0>+0|1>+\alpha|2>.$$

After signal 306 is applied for the appropriate duration the final state, denoted $|\Psi_F>$, of the system becomes:

$$|\Psi_F>=\beta|0>+\alpha|1>+0|2>.$$

The net result of the pulse sequence illustrated in FIG. 3 is that the |0> state component is swapped with the |1> state component and no information about energy level |2> remains. The duration of each of the respective signals depends on the Rabi frequency, and the Rabi frequency in turn depends on the energy level difference and the amplitude of the applied signal. Each of the pulses represents about a $\pi/2$ rotation angle, hence the appropriate duration for each of the pulses is given as $$t = \frac{\pi}{2 \cdot \Omega_R}.$$

In some embodiments, the duration of each of signals 302, 304 and 306 ranges from about 10 $\mu$s to 1 ns. In some embodiments, the duration of each of signals 302, 304 and 306 is less than 1 ns. In some embodiments, the duration of each of signals 302, 304 and 306 is more than 100 ps.

In another embodiment, an $R_X(\theta)$ operation includes (i) providing a system having a first and second energy level as basis states, and a third and fourth energy levels, wherein the third and fourth energy levels are above the central barrier, (ii) applying a first signal having an alternating amplitude, wherein the frequency of the first signal depends on the energy level difference between the first and the third energy levels, $\omega_{13}=E_3-E_1$, (iii) applying a second signal having an alternating amplitude, wherein the frequency of the second signal depends on the energy level difference between the second and fourth energy levels, $\omega_{24}=E_4-E_2$, (iv) applying a third signal having an alternating amplitude, wherein the frequency of the third signal depends on the energy level difference between the second and the third energy levels, $\omega_{23}=E_3-E_2$, and (v) applying a fourth signal having an alternating amplitude, wherein the frequency of the fourth signal depends on the energy level difference between the first and fourth energy levels, $\omega_{14}=E_4-E_1$, wherein the duration of the first and second signals represents that same rotation angle $\theta_1$ in the respective Rabi oscillation, and the duration of the third and fourth signals represents the same rotation angle $\theta_2$ in the respective Rabi oscillation. In some embodiments, the second rotation angle for the third and fourth signals $\theta_2=\pi/2$, and the first rotation angle for the first and second signals is chosen to select the desired rotation angle of the $R_X(\theta)$ operation. In some embodiments, the first and second signals can be applied simultaneously to the system, and the third and fourth signals can also be applied simultaneously, however, the durations of each of the signals will vary depending on the respective energy level separation.

5.3 Quantum Gates in Systems Having Two Pairs of Degenerate Energy Levels

Figure 4:
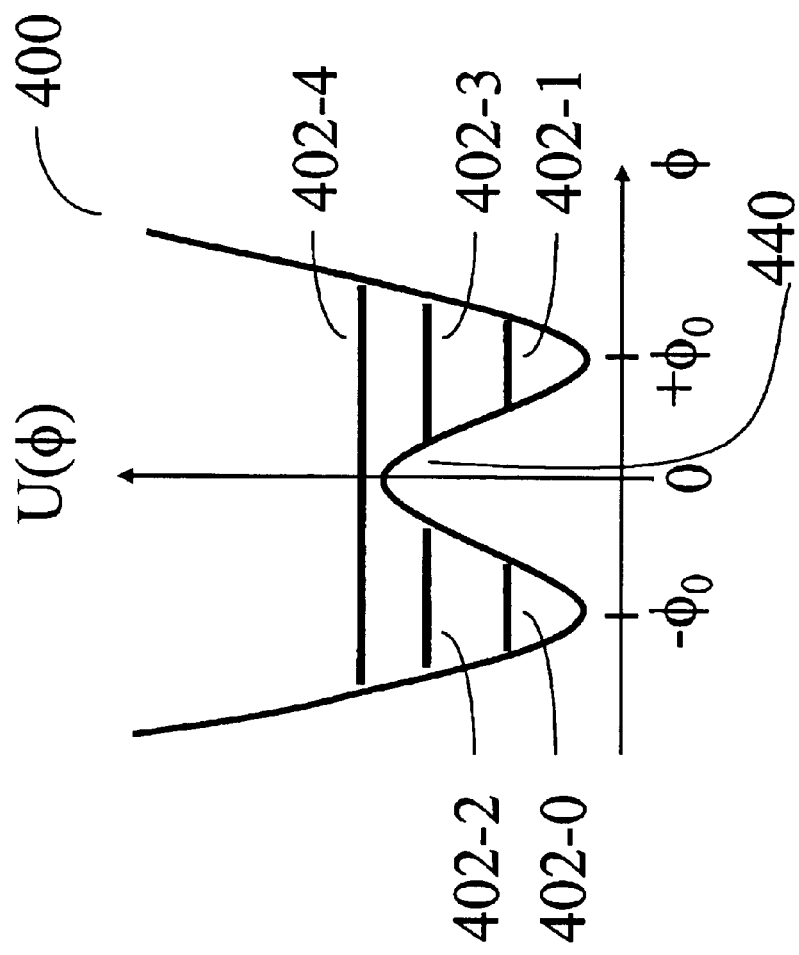
FIG. 4 illustrates another double well potential, in accordance with one embodiment.

Another aspect of the invention provides systems and methods for quantum computation. Referring to FIG. 4, this aspect of the invention uses a quantum system described by a potential energy diagram 400. Potential energy diagram 400 comprises two pairs of degenerate energy levels. The first pair of degenerate energy levels consists of energy levels 402-0 and 402-1 and the second pair consists of energy levels 402-2 and 402-3. In a quantum system described by diagram 400, energy level 402-0 is considered the |0> basis state and energy level 402-1 is considered the |1> basis state. In an embodiment of the present invention, the height of the barrier 440 relative to energy of the second pair of energy levels permits quantum tunneling between 402-2 and 402-3. The tunneling amplitude Δ of the system (levels 402-2 and 402-3) is the inverse of the period at which they naturally oscillate (e.g. the inverse of the period at which they naturally oscillate in the absence of an applied signal).

The quantum computation method in accordance with this aspect of the invention is described in FIG. 5. In step 502, an alternating signal is applied to the system for a time period 520, which depends on the Rabi frequency $\Omega_R$ as $$t = \frac{\pi}{2 \cdot \Omega_R}.$$

The frequency of the alternating signal correlates with the energy level separation between the first and second pairs of energy levels. In other words, the frequency of the alternating signal depends on the energy level separation between energy levels 402-0 (402-1) and 402-2 (402-3) (FIG. 5). The signal applied in step 502 causes the state of the system to shift from the basis states (|0>, energy level 402-0, and/or |1> energy level 402-1) to energy levels 402-2 and/or 402-3.

In step 504, the system is allowed to evolve freely for time period 530. During time period 530, the state of the system shifts from energy state 402-2 to 402-3 or vice versa at a determinable rate due to quantum tunneling effects. Quantum tunneling is a phenomena that occurs in systems governed by the laws of quantum mechanics and is further discussed in Section 2.7.1, above. Time period 530 depends on the desired quantum computing operation, and correlates with the tunneling amplitude Δ of the system as $\Delta^{-1}$.

In step 506, a signal that has the same characteristics as the signal applied in step 502 is applied for a time period 540. The signal applied in step 506 causes the system to shift from the second degenerate energy pair (energy states 402-2 and 402-3) back to the first degenerate energy pair (energy states 402-0 and 402-1). In some embodiments, time period 540 is the same as time period 520. In some embodiments, time period 540 is less than the period 520. Time periods 540 and 520 are a function of the power of the applied signal and the energy level separation.

The utility of this aspect of the present invention is best understood using an example. Consider the case in which a quantum system that has potential energy landscape 400 (FIG. 4). At some initial time prior to application of the inventive signal protocol, the system is in the |0> basis state (energy level 402-0). Upon application of the first external signal (FIG. 5, step 502), the system shifts to the 402-2 energy state.

During step 504 (FIG. 5), tunneling between the 402-2 energy state and the 402-3 energy state occurs at a rate that is dependent upon tunneling amplitude Δ. Therefore, the rate at which tunneling occurs between the 402-2 energy state and the 402-3 energy state is dependent upon the physical characteristics of the system and can be accurately determined. In order to achieve an $R_X(\pi)$ [quantum NOT] operation, time period 530 (step 504, FIG. 5) is chosen such that the system completely evolves (tunnels) from the 402-2 energy state to the 402-3 energy state. Next, application of a third external signal (step 506, FIG. 5) causes the state of the system to shift from the 402-3 energy state to the 402-1 energy state.

The methods provided in this aspect of the invention are capable of achieving quantum operations irrespective of the initial state of the system. In other words, methods in accordance with this aspect of the invention can be used in quantum systems described by potential energy diagram 400 in which the initial state is a superposition of the |0> basis state and the |1> basis state. The precise quantum gate that is applied to the system is determined by the length of time period 530 that the system is allowed to evolve (tunnel) during step 504 (FIG. 5). In the example provided above, time period 530 (step 504, FIG. 5) is chosen such that a $R_X(\pi)$ [quantum NOT] operation is achieved. However, other gates are possible by choosing different time periods 530.

5.4 Readout Operation

The present invention provides readout operation methods, discussed in Section 5.4.1 below, and readout operation apparatus, discussed in Section 5.4.2 below.

5.4.1 Readout Operation Methods

One aspect of the present invention provides a method for performing a readout operation. This aspect of the invention is applicable to a quantum system that is described by a potential energy diagram that has at least three energy levels. Two of these energy levels may be degenerate and the third energy level has a finite probability of tunneling to a nonstationary state.

In the inventive method, the quantum system is biased so that the degeneracy between the first and second energy levels is broken. In one embodiment, the bias is applied by application of a direct current across a Josephson junction as described in Section 5.4.2 below. When the system is biased, it has the potential energy diagram illustrated in FIG. 2.

Next, a third energy level 202-R (FIG. 2) is selected, wherein the third energy level has a non-zero probability of escaping from the double well potential, and an alternating signal is applied to the biased quantum system. The frequency of this alternating signal determines which of the basis states |0> (FIG. 2, 202-0) or |1> (FIG. 2, 202-1) of the system are read out. When the frequency $\omega_R$ of the alternating signal depends on the energy difference between the third energy level (FIG. 2, 202-2) and the first energy level (FIG. 2, 202-0), as $\omega_R = E_{202\text{-}R} - E_{202\text{-}0}$, the state of the system shifts from the |0> basis state to the third energy level (FIG. 2, 202-R). Because the third energy level has a finite probability of tunneling to nonstationary state 202-R (FIG. 2), the state of the |0> basis state can be read out from the nonstationary state 202-R. When the frequency $\omega_R$ of the alternating signal depends on the energy difference between the third energy level (FIG. 2, 202-R) and the second energy level (FIG. 2, 202-1), as $\omega_R = E_{202\text{-}R} - E_{202\text{-}1}$, the state of the system shifts from the |1> basis state to the third energy level (FIG. 2, 202-R). In this way, the state of the |1> basis state can be read out by measuring the nonstationary state 202-R.

This aspect of the invention is applicable to any system that can be biased so that it has the potential energy diagram 200 (FIG. 2). The method is not limited to reading out systems that are entirely in the |0> basis state or the |1> basis state. In fact, the method can be used to read out systems that are in any superposition of the |0> basis state and the |1> basis state. This is accomplished by applying one of two external signals. One of the two signals is used to read out the |0> basis state. The frequency of this signal correlates to the difference between energy level 202-2 and energy level 202-0 (FIG. 2). The other of the two signals is used to read out the |1> basis state. The frequency of this other signal correlates to the difference between energy level 202-2 and energy level 202-1 (FIG. 2).

5.4.2 System Apparatus

One embodiment of the present invention provides a system 600 (FIG. 6A) for performing the readout operation discussed in Section 5.4.1. System 600 comprises a Josephson junction 640-A, a current source 650, and voltmeter 660. Josephson junction 640-A is formed out of the juxtaposition of two misoriented unconventional (d-wave) superconducting materials. An unconventional superconducting material has a pairing symmetry with non-zero angular momentum of its Cooper pairs.

Materials useful for forming Josephson junction 640-A include, but are not limited to, heavy fermions (e.g., $UPt_3$ and $URu_2Si_2$), $Sr_2RuO_4$ and the high-$T_c$ cuprates (e.g., $YBa_2Cu_3O_{7-x}$, $La_{1.85}Ba_{0.15}CuO_4$, $Tl_2Ba_2CuO_{6+x}$, and $Hg_{0.8}Tl_{0.2}Ba_2Cu_3O_{8.33}$). $YBa_2Cu_3O_{7-x}$ is also referred to as YBCO. Additional materials useful for forming Josephson junction 640-A include p-wave superconductors. In some embodiments, Josephson junction 640-A initially provides a double degenerate ground state (e.g., FIG. 1B). In one embodiment, Josephson junction 640-A is the sub-micron grain boundary Josephson junction described in Il'ichev et al, 2001, Physical Review Letters 86, 5369, which is hereby incorporated by reference in its entirety.

In some embodiments of the present invention, Josephson junction 640-A has a width ranging from 0.1 micrometers ($\mu$m) or less up to approximately 1 $\mu$m or more. In some embodiments, the estimated Josephson penetration depth $\lambda_J$ of Josephson junction 640-A is larger than the width of the junction. In some embodiments, the critical current density $j_c$ of Josephson junction 640-A is between $10^2$ and $10^4$ Amperes/centimeter$^2$ (A/cm$^2$). In some embodiments, Josephson junction 640-A has a capacitance of C=10 femto-Farads (fF). In some embodiments, Josephson junction 640-A has a critical current, denoted $I_c$, of 100 nanoAmperes (nA). In some embodiments, Josephson junction 640-A has a plasma frequency, denoted $\omega_p$, of 25 GHz. In some embodiments, Josephson junction 640-A has a ratio of Josephson energy $E_J$ to Coulomb energy $E_C$ of approximately 15.

Parameter ranges useful for a system in accordance with an embodiment of the present invention include the following. The Josephson junction can have a capacitance C=10 femto-Farads (fF), and can range in size from about 100 nano-meters (nm) to about 1800 nm, respectively corresponding to the range 10 femto-Farads (fF)–200 fF. The critical current scales with width (for constant thickness) as $I_c \propto w^2$, and useful widths range from about 50 nm to about 4000 nm, for a corresponding range of critical current values of 100 nA–20 micro-Amperes ($\mu$A). The plasma frequency can range from about 1 GHz to about 500 GHz. In a bistable Josephson junction (i.e. d-wave grain boundary Josephson junctions) as the capacitance is increased, while the critical current remains the same, the plasma frequency decreases at a rate of about $$\frac{1}{\sqrt{C}}.$$

As the width of the Josephson junction is increased, and the film thickness is held constant, the plasma frequency increases as about $\sqrt{w}$. A ratio of Josephson energy $E_J$ to Coulomb energy $E_C$ can be approximately 15, and a useful range is about 32 through 3, or about 1%–33%.

Figure 6A:
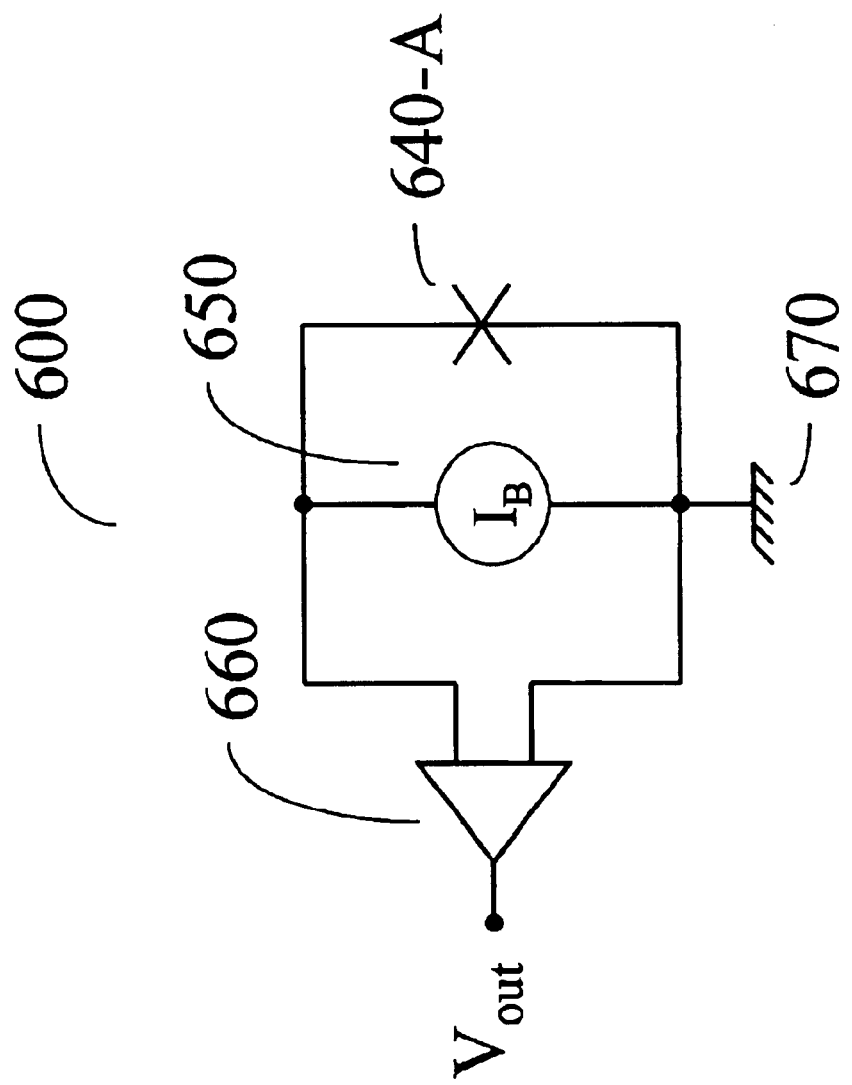
FIGS. 6A and 6B illustrate systems capable of supporting a double well potential, in accordance with various embodiments

In one embodiment, Josephson junction 640-A (FIG. 5) has a double well potential with respect to phase across the junction in the absence of external bias. In this embodiment, Josephson junction 640-A can be used as a qubit and can be read out using the techniques disclosed in Section 5.4.1 above. In order to induce Rabi oscillations between energy levels or basis states of system 600, an alternating current, having a frequency tuned to the energy difference between the respective energy levels, is applied. In order to read out the state of the system, a bias is applied to break the degeneracy of the double well potential to create a system having an energy diagram like that illustrated in FIG. 2. In one embodiment, the bias is applied by application of a direct current across Josephson junction 640-A. An alternating signal is then applied. The frequency of this alternating signal has a frequency that is associated with the difference between a readout energy level and the first or second energy levels. The readout energy level is found by taking an energy level in the double well potential that is close to but still below that of outer barriers 211 and 212 (FIG. 2), such that if the system is excited to that energy level it will have a high probability of tunneling to the non-stationary state. Referring again to FIG. 2, the readout energy level is represented by energy level 202-R and the associated frequency between energy levels 202-R and 202-1 is $\omega_{1R}$. If system 200 is excited to energy level 202-R it will have a high probability of escaping the potential well on the side where the barrier is lower (FIG. 2, 211). In FIG. 6A, measurement of the state of system 600 can be realized by detecting the non-stationary state 202-R by measuring for a potential drop across Josephson junction 640-A.

5.5 Physical Systems

Figure 6B:
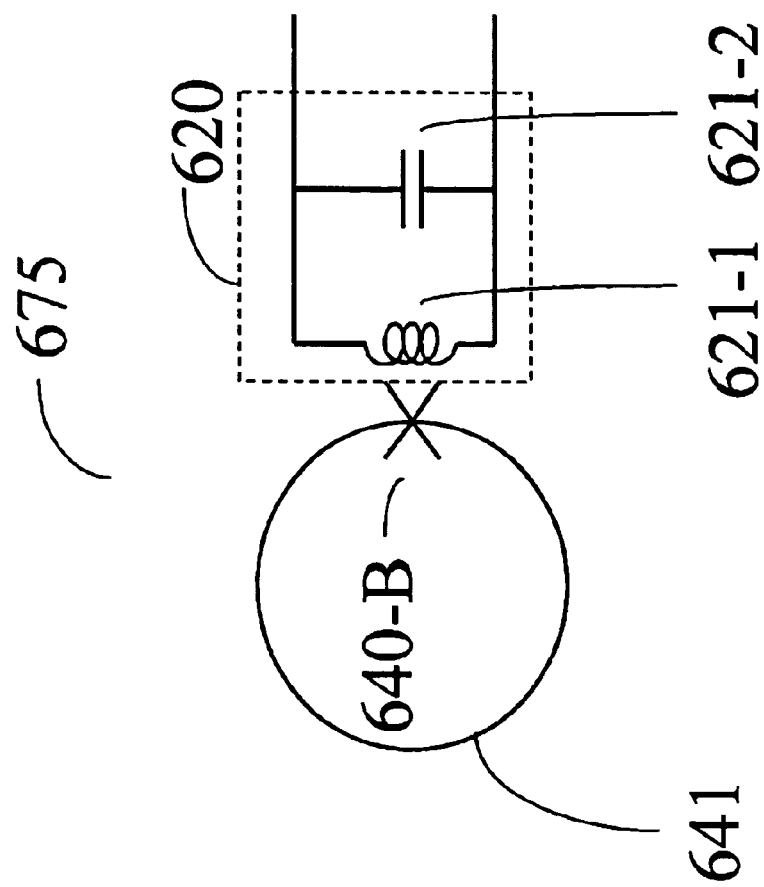
Figure 8:
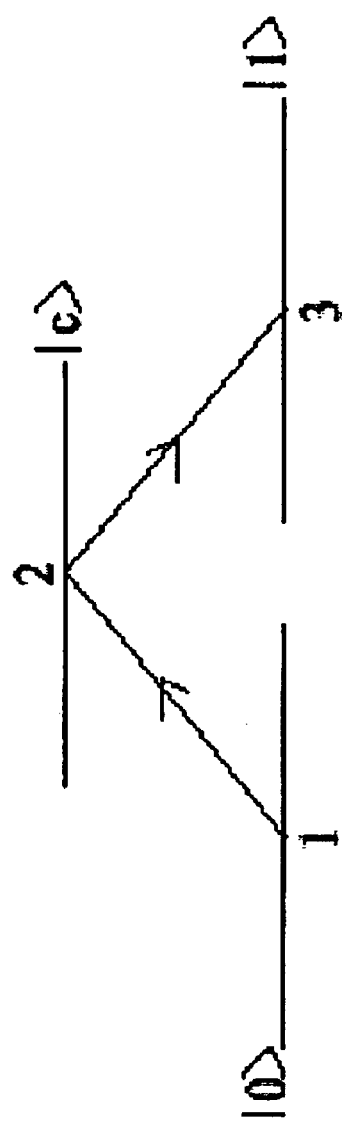
FIG. 8 illustrates a Λ-shaped configuration of energy levels in accordance with the prior art.

Another embodiment provides a physical system 675 (FIG. 6B) for performing the methods for quantum computing described in the sections above. System 675 includes a radio frequency superconducting quantum interference device (rf-SQUID). FIG. 6B illustrates an rf-SQUID system 675, that includes a loop of conventional superconducting material 641, a Josephson junction 640-B breaking loop 641, and a system 620 for controlling and measuring loop 641. Control system 620 is any system that can apply flux through loop 641. Representative control systems 620, in accordance with various embodiments of the invention, include dc-SQUIDs and tank circuits, both of which are well known in the art. See, e.g., U.S. patent application Ser. No. 60/341, 794, entitled "Characterization And Measurement of Superconducting Structures" filed Dec. 18, 2001; Il'ichev et al., 2001, *Review of Scientific Instruments* 72, pp. 1882–1887; and Makhlin et al., 2001, "Quantum-State Engineering with Josephson-Junction Devices," *Reviews of Modern Physics*, 73, p. 357, which are hereby incorporated by reference in their entireties.

System 675 is typically flux-biased in order to form a double well potential. In one embodiment, application of an alternating signal to system 675 comprises driving the signal through control system 620.

5.6 Further Physical Systems

Another embodiment of the present invention provides a microscopic physical system 700 (FIG. 7) for performing the methods for quantum computing described in the sections above. Embodiments of the present invention include the use of microscopic systems as qubits. System 700 includes a single molecule that includes a double well energy potential. An example of such a molecule is the well known ammonia molecule ($NH_3$) which has a double well energy potential for position of the nitrogen atom. See e.g., R. Feynman, *The Feynman Lectures on Physics* (Addison-Wesley, Reading, Mass., 1964), Vol. 3, which is hereby incorporated by reference in its entirety. Other examples of such molecules are $XY_3$ molecules. Embodiments of the present invention make use of $XY_3$ molecules for quantum computing. $XY_3$ molecules are trigonal pyramidal molecules having hydrogen atoms (H) (or an isotope of hydrogen such as deuterium (D) or tritium (T)), all denoted by the variable Y, arranged in a plane 706. Examples of $XY_3$ molecules include, but are not limited to $NH_2CN$, arsine ($AsH_3$) and phosphine ($PH_3$). The X molecule (N in the case of ammonia, As in the case of arsine, and so forth) can be found at various points along the vertical reference line 705. System 700 can form a double well potential such as that illustrated in FIG. 1A. In some embodiments, the ground state energy level 100-0 of the double well energy potential corresponds to the X molecule being in position 701 above plane 706, and the ground state energy level 100-1 of double well energy potential corresponds to the X molecule being in position 702 below plane 706.

In the case of the ammonia molecule, which has a large tunneling amplitude, the nitrogen atom will naturally (coherently) tunnel between positions 701 and 702 relative to the plane of the hydrogen atoms (and therefore between energy levels 100-0 and 100-1). The ammonia molecule has been proposed as a qubit. See, e.g., Andrew J. Ferguson, Paul A. Cain, David A. Williams, and G. Andrew D. Briggs, "Ammonia-based quantum computer", *Physical Review* A, 65, 034303 (2002), which is hereby incorporated by reference in its entirety. However, the single qubit NOT operation relies on the natural tunneling of ammonia. Therefore, in the Ferguson et al. implementation of a NOT operation, the qubit oscillates between information states at a given frequency correlated with the probability for the state of the system to tunnel under barrier 110 from FIG. 1A. The NOT operation occurs due to natural tunneling (unprompted by outside signals) resulting in a system that undergoes undesired evolution when it is isolated.

Some embodiments of the present invention include qubits comprised of molecules with double well potential but without significant natural tunneling to perform the methods for quantum computing described in the sections above. These embodiments of the present invention can make use of $XH_3$ molecules having a tunneling amplitude, expressed in frequency units, that is less than the Rabi frequency. Without tunneling, a NOT operation in accordance with aspects of the present invention can be induced through Rabi oscillations. Referring to FIG. 1B, some embodiments of the present invention can make use of a third energy level 100-2 that is above the barrier 110. The level 100-2 need not be the first level above barrier 110. Some embodiments of the present invention make use of an energy level 100-2 that is about $10^{11}$ to about $10^{15}$ Hertz separated from energy levels 100-0 or 100-1. Further embodiments of the present invention include qubits comprised of ensembles of molecules having a double well potential with a tunneling amplitude that, expressed in frequency units, is approximately equal to or less than the arithmetic inverse of the decoherence time of the qubit. The dipole moment of an $XY_3$ molecule is non-zero and depends on the state of the molecule. Some embodiments of the present invention use the differing dipole moments of $XY_3$ molecules in an ensemble of $XY_3$ molecules to identify the state of the molecule. Some embodiments of the present invention use electric fields to separate molecules in each of the two ground states. In these embodiments, the electric field accelerates molecules having different dipole moments in opposite directions, causing the molecules to group into different velocities. Some embodiments of the present invention use this velocity selection to selectively induce quantum NOT operations. Laser light that is slightly detuned by an amount $\epsilon$ from the appropriate frequency for inducing a quantum NOT operation, i.e., $\omega_{01}$, is applied to the ensemble of molecules. The detuning $\epsilon$ is matched to a Doppler shift in the energy level separation of a particular velocity group. The sign of the Doppler shift is direction dependent and therefore the quantum NOT operation can be selectively preformed on the molecules of a particular velocity group. Selection of a velocity group of molecules based on Doppler shift detuning is well known. See, e.g., H. J. Metcalf and P. van der Straten, *Laser Cooling and Trapping*, (Springer-Verlag, New York, 1999), and Cohen-Tannoudji et al., *Reviews of Modern Physics*, 70, p. 707 (1998), which are hereby incorporated by reference in their entireties.

5.7 Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for quantum computing with a quantum system comprising a first energy level, a second energy level, and a third energy level, wherein said first energy level and said second energy level are capable of being degenerate with respect to each other, the method comprising:

applying to said quantum system a signal having an alternating amplitude at an associated frequency, wherein (i) said associated frequency of said signal correlates with an energy level separation between the first energy level and the third energy level or (ii) said associated frequency of said signal correlates with an energy level separation between the second energy level and the third energy level, thereby inducing an oscillation in a state of said quantum system between said first energy level and said second energy level.

2. The method of claim 1, wherein said first energy level and said second energy level form basis states of a qubit.

3. The method of claim 1, wherein a rate that the signal is applied to said quantum system is a function of a maximum amplitude of the signal.

4. The method of claim 1, wherein the signal is detuned during said applying step by an amount δ from a value of the associated frequency.

5. The method of claim 4, wherein the amount δ is between −2 and 300 percent of the value of the associated frequency.

6. The method of claim 4, wherein the amount δ is between −50 and 200 percent of the value of the associated frequency.

7. The method of claim 4, wherein the amount δ is between 1 MHz and 1 GHz.

8. The method of claim 1, wherein the applying step has a duration greater than 100 picoseconds and less than 10 microseconds.

9. A method for quantum computing with a quantum system having a first pair of degenerate energy levels and a second pair of energy levels, the method comprising:

applying to said quantum system a first signal having an alternating amplitude at an associated frequency for a first time period, wherein the associated frequency of said first signal correlates with an energy level separation between an energy level in the first pair of degenerate energy levels and an energy level in the second pair of energy levels;

allowing the quantum system to evolve for a second time period; and reapplying said first signal for a third time period.

10. The method of claim 9, wherein said third time period is the same as said first time period.

11. The method of claim 9, wherein the first time period is between 1 picosecond and 10 microseconds.

12. The method of claim 9, wherein the second time period permits a single qubit operation that induces an angle of rotation between 0 radians and $2\pi$ radians to a state of the quantum system.

13. The method of claim 9, wherein the second time period is the inverse of a tunneling frequency of the second pair of energy levels.

14. The method of claim 9, wherein there is natural quantum tunneling between a first energy level and a second energy level of the second pair of energy levels.

15. The method of claim 9, wherein the second pair of energy levels is degenerate.

16. The method of claim 9, wherein the third time period is greater than 1 picosecond and less than 10 microseconds.

17. A method for quantum computing with a quantum system comprising a first energy level, a second energy level and a third energy level, the method comprising inducing an oscillation in a state of said quantum system between said first energy level and said second energy level by:

applying to said quantum system a first signal having an alternating amplitude at an associated first frequency for a first time period, wherein said associated first frequency of said first signal correlates with an energy level separation between the first energy level and the third energy level;

applying to said quantum system a second signal having an alternating amplitude at an associated second frequency for a second time period, wherein said associated second frequency of said second signal correlates with an energy level separation between the second energy level and the third energy level; and reapplying said first signal to said quantum system for a third time period.

18. A method for performing a readout operation of a quantum system having a first energy level, a second energy level, and a third energy level, wherein said third energy level has a measurable escape path, the method comprising:

applying to said quantum system a signal having an alternating amplitude at an associated frequency, wherein said associated frequency of said signal correlates with an energy level separation between (i) said first energy level and said third energy level or (ii) said second energy level and said third energy level; and determining when a particle of the system has escaped said third energy level through said measurable escape path.

19. The method of claim 18, wherein the first energy level and the second energy level differ in energy.

20. A qubit comprising a Josephson junction formed by an intersection of a first bank of unconventional superconducting material and a second bank of unconventional superconducting material, wherein said qubit is characterized by a first basis state and a second basis state and wherein said first basis state and said second basis state respectively correspond to a first ground state energy level and a second ground state energy level of the Josephson junction; and wherein said first ground state energy level and said second around state energy level are degenerate with respect to each other.

21. The qubit of claim 20, further comprising a current source attached to said first bank or said second bank, wherein the current source is configured to change a relative energy of said first ground state energy level and said second ground state energy level.

22. The qubit of claim 20, further comprising a voltmeter in electrical communication with said first bank or said second bank, wherein the voltmeter is configured to measure a potential drop across the Josephson junction.

23. A qubit quantum computing system comprising a qubit comprising a molecule having a first ground state and a second ground state, the first ground state and the second ground state each corresponding to an energy level in a double well energy potential that describes a potential energy of said qubit, wherein the double well energy potential has an associated tunneling amplitude that describes a potential energy barrier between said first ground state and said second ground state; and a laser, wherein the laser is able to induce a Rabi oscillation between said first ground state and said second ground state in said qubit; wherein the associated tunneling amplitude is less than the frequency of said Rabi oscillation.

24. The quantum computing system of claim 23, wherein the associated tunneling amplitude is equal to or less than the arithmetic inverse of a decoherence time associated with the qubit.

25. The quantum computing system of claim 23, wherein the molecule comprises a chemical group including a plurality of covalently bound atoms, and wherein two or more atoms in said plurality of covalently bound atoms are hydrogen atoms.

26. The quantum computing system of claim 23, wherein the molecule is arsine ($AsY_3$), phosphine ($PY_3$), or $NY_2CN$, wherein each Y is the same or different and is independently selected from the group consisting of hydrogen, deuterium, and tritium.

* * * * *

UNITED STATES PATENT AND TRADEMARK OFFICE
CERTIFICATE OF CORRECTION

PATENT NO.     : 6,943,368 B2
DATED          : September 13, 2005
INVENTOR(S)    : Amin et al.

It is certified that error appears in the above-identified patent and that said Letters Patent is hereby corrected as shown below:

Column 21,
Line 19, replace "-2" with -- 2 --.

Column 22,
Line 48, delete "qubit" and after the word "comprising" insert -- : --.

Signed and Sealed this

Twenty-second Day of November, 2005

JON W. DUDAS
*Director of the United States Patent and Trademark Office*